(12) United States Patent
Croft

(10) Patent No.: US 11,190,916 B2
(45) Date of Patent: Nov. 30, 2021

(54) CONNECTED VEHICLE NETWORK ACCESS OPTIMIZATION USING AN INTERMEDIARY PLATFORM

(71) Applicant: AT&T Mobility II LLC, Atlanta, GA (US)

(72) Inventor: John Michael Croft, Dallas, TX (US)

(73) Assignee: AT&T Mobility II LLC, Atlanta, GA (US)

(*) Notice: Subject to any disclaimer, the term of this patent is extended or adjusted under 35 U.S.C. 154(b) by 337 days.

(21) Appl. No.: 16/283,316

(22) Filed: Feb. 22, 2019

(65) Prior Publication Data
US 2020/0275246 A1    Aug. 27, 2020

(51) Int. Cl.
| | |
|---|---|
| H04L 29/08 | (2006.01) |
| G06F 21/00 | (2013.01) |
| H04W 4/48 | (2018.01) |
| H04W 4/70 | (2018.01) |
| H04L 29/06 | (2006.01) |
| H04W 12/086 | (2021.01) |

(52) U.S. Cl.
CPC ............ H04W 4/48 (2018.02); H04L 63/20 (2013.01); H04W 4/70 (2018.02); H04W 12/086 (2021.01)

(58) Field of Classification Search
CPC ........ H04L 63/102; H04L 63/20; H04W 4/70; H04W 4/40; H04W 12/086; H04W 4/48
USPC .......................................................... 726/1
See application file for complete search history.

(56) References Cited

U.S. PATENT DOCUMENTS

| | | | |
|---|---|---|---|
| 7,336,943 B2 | 2/2008 | Crocker et al. | |
| 8,219,710 B2 | 7/2012 | Yi et al. | |
| 8,447,465 B2 | 5/2013 | Jiang et al. | |
| 9,371,004 B2 | 6/2016 | Wehrman et al. | |
| 9,756,669 B2 | 9/2017 | Das et al. | |
| 10,027,805 B2 | 7/2018 | Husain et al. | |
| 10,142,420 B2 | 11/2018 | Lei et al. | |
| 2007/0011278 A1 | 1/2007 | Nou | |
| 2011/0307119 A1* | 12/2011 | Basir ...................... | G07C 5/008 701/1 |
| 2014/0334447 A1* | 11/2014 | Kim .................. | H04W 36/0072 370/331 |
| 2015/0298705 A1* | 10/2015 | Kiyama ................ | G06Q 40/08 702/94 |

(Continued)

FOREIGN PATENT DOCUMENTS

| | | |
|---|---|---|
| KR | 101655822 | 9/2016 |
| KR | 101681146 | 11/2016 |

Primary Examiner — Haresh N Patel
(74) Attorney, Agent, or Firm — Hartman & Citrin LLC

(57) ABSTRACT

Concepts and technologies directed to connected vehicle network access optimization are disclosed herein. Embodiments can include a system that includes a processor and a memory storing computer-executable instructions that configure a processor to perform operations. The operations can include receiving an access probe message from a telematics control unit of a vehicle. The operations can include determining that the telematics control unit is not authorized to access a network communication service. The operations can further include generating an access redirect command that instructs a head unit of the vehicle to bypass a machine-to-machine platform so as to enable access to the network communication service via a network service portal. The operations can include providing the access redirect command to the telematics control unit of the vehicle.

18 Claims, 7 Drawing Sheets

(56) References Cited

U.S. PATENT DOCUMENTS

| | | | |
|---|---|---|---|
| 2016/0075232 A1 | 3/2016 | Wehrman et al. | |
| 2016/0101785 A1* | 4/2016 | Takahashi | G06K 9/00791 |
| | | | 701/31.4 |
| 2016/0309527 A1* | 10/2016 | Chen | H04W 76/11 |
| 2017/0105171 A1* | 4/2017 | Srivastava | H04W 12/086 |
| 2017/0339095 A1 | 11/2017 | Lei et al. | |
| 2018/0218034 A1* | 8/2018 | Sainaney | G06F 9/542 |
| 2019/0044737 A1* | 2/2019 | Singhi | H04L 9/3263 |
| 2019/0239155 A1* | 8/2019 | Ushida | H04W 48/18 |
| 2020/0005644 A1* | 1/2020 | Ichimaru | B60R 21/00 |
| 2020/0402397 A1* | 12/2020 | Yamazaki | G08G 1/0116 |
| 2020/0402406 A1* | 12/2020 | Sakakibara | G08G 1/0137 |
| 2021/0014643 A1* | 1/2021 | Kuroda | G08G 1/09 |

\* cited by examiner

CONNECTED VEHICLE NETWORK ACCESS OPTIMIZATION USING AN INTERMEDIARY PLATFORM

BACKGROUND

Historically, communications networks were relegated to providing communicative coupling between communication equipment that was stationary and thus associated with a fixed or otherwise constant geographical location. With the rise of portable user equipment with wireless communication functionality, communicative coupling with a communications network and/or peer devices may occur from a variety of locations. The implementation of communicative coupling into vehicles can facilitate the advancement of autonomous vehicles that customers may use in their daily commutes along roadways, highways, and/or any other thoroughfare. Yet, as more vehicles are equipped with communication functionality, the communications network may limit network access only to recognized vehicles. In some instances, vehicles may attempt to communicate with the communications network irrespective of whether a particular vehicle is authorized to use that communications network. As more vehicles send communications between each other and/or with the communications network, the communications network may consume additional network resources to accommodate or otherwise support communicative coupling. As such, the amount of communications generated by vehicles may contribute to network congestion, which in turn can also affect end-to-end network latency.

SUMMARY

The present disclosure is directed to connected vehicle network access optimization, according to various embodiments. According to one aspect of the concepts and technologies disclosed herein, a system is disclosed. In some embodiments, the system can include a core server, a machine-to-machine server, and/or a telematics control unit. In some embodiments, the system can include a processor and a memory. The memory can store computer-executable instructions that, in response to execution by the processor, cause the processor to perform operations. In some embodiments, the operations can include receiving an access probe message from a telematics control unit of a vehicle. The operations can include determining that the telematics control unit is not authorized to access a network communication service. The operations can include generating an access redirect command that instructs a head unit of the vehicle to bypass a machine-to-machine platform so as to enable access to the network communication service via a network service portal. The operations can include providing the access redirect command to the telematics control unit of the vehicle.

In some embodiments, the access probe message comprises a probe uniform resource locator that is associated with the network communication service. In some embodiments, the access probe message requests forwarding of the access probe message to a core server associated with the network communication service. In some embodiments, the operations can further include preventing the access probe message from being forwarded to a core server associated with the network communication service. In some embodiments, the operations can further include generating an authorized access policy map associated with the network communication service, where the authorized access policy map is based on an access policy from a core server that supports the network communication service. In some embodiments, determining that the telematics control unit is not authorized to access the network communication service can be based on the telematics control unit having a telematics control unit identifier that does not correspond with an authorized identifier of the authorized access policy map. In some embodiments, the operations can further include receiving an access update message from the core server that supports the network communication service and instantiating an instance of an authorized identifier on the authorized access policy map for the telematics control unit of the vehicle.

According to another aspect of the concepts and technologies disclosed herein, a method is disclosed according to an embodiment. In some embodiments, the method can include receiving, by a server of a serving network, an access probe message from a telematics control unit of a vehicle. The method can include determining, by the server, that the telematics control unit is not authorized to access a network communication service. The method can include generating, by the server, an access redirect command that instructs a head unit of the vehicle to bypass a machine-to-machine platform so as to enable access to the network communication service via a network service portal. The method can further include providing, by the server, the access redirect command to the telematics control unit of the vehicle.

In some embodiments, the access probe message can include a probe uniform resource locator that is associated with the network communication service. In some embodiments, the access probe message requests forwarding of the access probe message to a core server associated with the network communication service. In some embodiments, the method can further include preventing, by the server, the access probe message from being forwarded to a core server associated with the network communication service. The method can further include generating, by the server, an authorized access policy map associated with the network communication service, where the authorized access policy map can be based on an access policy from a core server that supports the network communication service. In some embodiments, determining that the telematics control unit is not authorized to access the network communication service is based on the telematics control unit having a telematics control unit identifier that does not correspond with an authorized identifier of the authorized access policy map. The method can further include receiving, by the server, an access update message from the core server that supports the network communication service. The method can further include instantiating, by the server, an instance of an authorized identifier on the authorized access policy map for the telematics control unit of the vehicle.

According to another aspect of the concepts and technologies disclosed herein, a computer storage medium is disclosed according to an embodiment. The computer storage medium can have computer-executable instructions stored thereon that, in response to execution by a processor, cause the processor to perform operations. The operations can include receiving an access probe message from a telematics control unit of a vehicle. The operations can include determining that the telematics control unit is not authorized to access a network communication service. The operations can include generating an access redirect command that instructs a head unit of the vehicle to bypass a machine-to-machine platform so as to enable access to the network communication service via a network service portal. The operations can include providing the access redirect command to the telematics control unit of the vehicle.

In some embodiments, the access probe message can include a probe uniform resource locator that is associated with the network communication service, and the access probe message requests forwarding of the access probe message to a core server associated with the network communication service. In some embodiments, the operations further can include preventing the access probe message from being forwarded to a core server associated with the network communication service. The operations can further include generating an authorized access policy map associated with the network communication service, where the authorized access policy map is based on an access policy from a core server that supports the network communication service. In some embodiments, determining that the telematics control unit is not authorized to access the network communication service is based on the telematics control unit having a telematics control unit identifier that does not correspond with an authorized identifier of the authorized access policy map. In some embodiments, the operations further can include receiving an access update message from the core server that supports the network communication service, instantiating an instance of an authorized identifier on the authorized access policy map for the telematics control unit of the vehicle.

It should be appreciated that the above-described subject matter may be implemented as a computer-controlled apparatus, a computer process, a computing system, a method, or as an article of manufacture such as a computer storage medium. These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
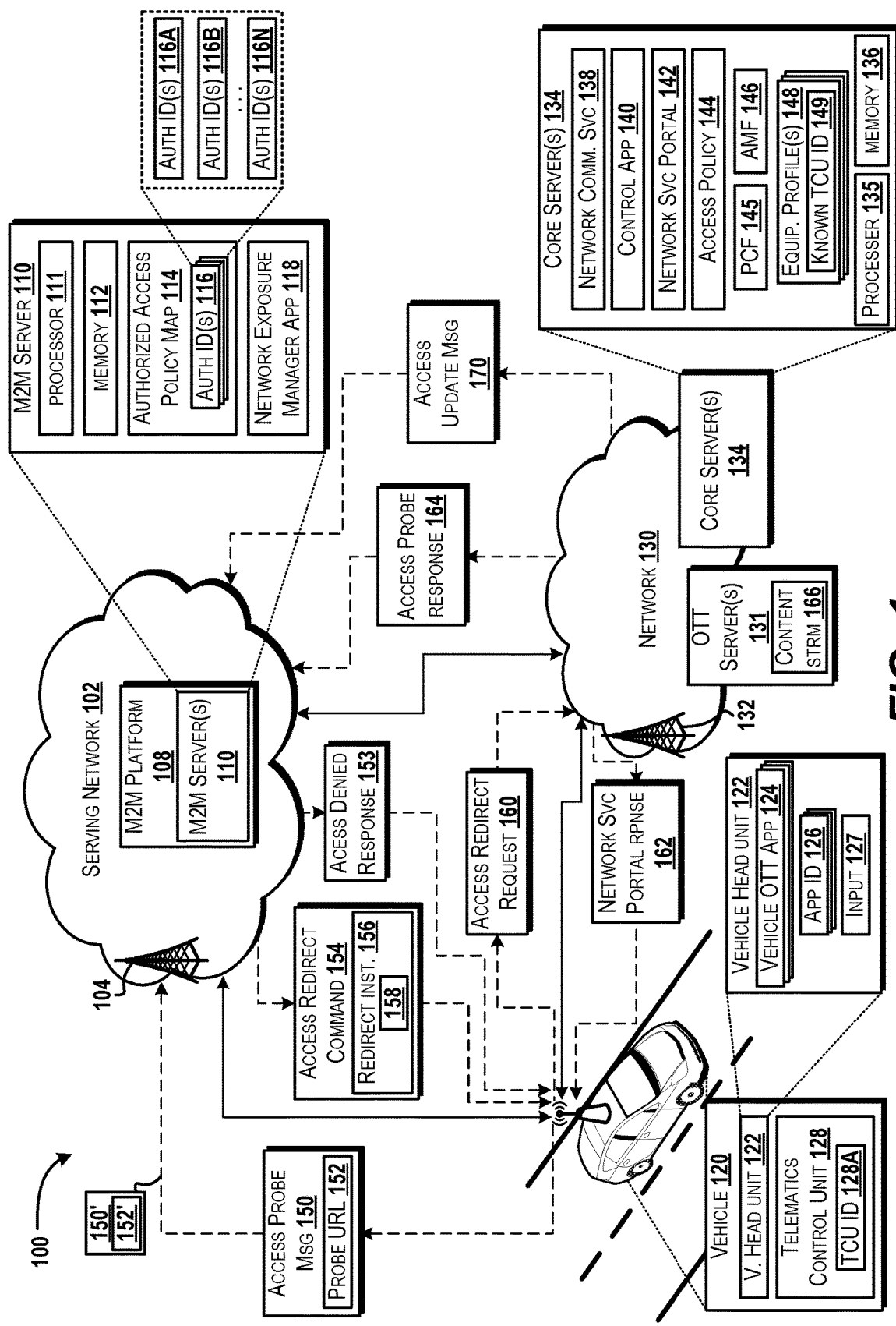
FIG. 1 is a block diagram illustrating an example operating environment for implementing connected vehicle network access optimization, according to an illustrative embodiment.

The following detailed description is directed to connected vehicle network access optimization, according to various embodiments. Vehicles may be manufactured with various computer systems that can execute vehicle applications. Some vehicle applications may be configured to rely on network access so that certain functions, operations, and/or user interfaces and graphics may be presented to a user within the vehicle. In some instances, a vehicle application may be considered an over-the-top ("OTT") application based on the OTT application relying on network infrastructure to deliver audio, video, information, calls, a combination thereof, or other content to and/or from a service and/or platform on a network. In some embodiments, an instance of an OTT application that is implemented or otherwise included for operation in and/or with a vehicle (e.g., executing on a vehicle head unit) may be referred to as a "vehicle OTT application." In some embodiments, a developer of a vehicle OTT application may be pre-loaded and/or installed onto a vehicle head unit. Some vehicle OTT applications may operate with a configuration that assumes the state of network access is "always on" (i.e., the vehicle OTT application always has access to a network connection via the vehicle communication equipment) or "always denied" (i.e., the vehicle OTT application is always denied network access via the vehicle's communication equipment, such as a telematics control unit). In some instances, a vehicle OTT application may assume that access to a network is available because a connection to a network can be found. If a network connection is found (or assumed to be present), the vehicle OTT application may attempt to connect with a network service. Yet the connection and/or access to the network service may be denied due to the vehicle not being registered or otherwise authorized to use the network service. As more vehicles send and receive communications to/from the network, the communications network may consume additional network resources to accommodate or otherwise support attempts at network access to utilize a network service, despite the vehicle OTT application not being authorized for access via the vehicle. As such, the amount of communications generated by vehicles may contribute to network congestion, which may burden network infrastructure and in turn can also affect end-to-end network latency.

Therefore, embodiments of the disclosure can provide connected vehicle network access optimization that enables various vehicle OTT applications to access a network service, while mitigating back-end network traffic that may burden or otherwise decrease network efficiency. Embodiments of the present disclosure provide a machine-to-machine platform that intercepts messages from a vehicle that are directed to a core server and/or an OTT server associated with execution of the vehicle OTT application. In various embodiments, all and/or any communications may initially be routed through the machine-to-machine platform irrespective of where the message is targeted or directed. In some embodiments, the machine-to-machine platform can enable a vehicle communications to bypass the machine-to-machine platform by creating and providing an access redirect command to the vehicle. If the vehicle (and thus also a telematics control unit of the vehicle) is not authorized to use the network communications service, embodiments of the present disclosure can enable the vehicle head unit to be informed that the vehicle is currently not authorized to use the network communication service (i.e., blocked) despite the vehicle being within a functioning service area of the serving network (i.e., within range of send/receiving communications with the serving network). Embodiments of the present disclosure can prevent the vehicle from receiving service from the OTT server via the serving network until the vehicle is authorized by the core server to use the network communications service. As such, the machine-to-machine server can provide, to the vehicle, an access redirect command that causes the vehicle's telematics control unit to directly contact the core server—without being routed through the machine-to-machine platform—so that the vehicle can access a network service portal and become authorized to utilize the network communication service so as to contact the OTT server through the machine-to-machine platform. By this, the vehicle head unit will not merely present "no service" when a vehicle is within communicative coupling range of the serving network but not authorized to use the network communication service, but rather the vehicle head unit and the vehicle telematics control unit can be configured to bypass the machine-to-machine platform so as to obtain authorization to use the network communication service. Once the machine-to-machine platform is updated to reflect the authorization for the vehicle, then communications (e.g., messages, media content streams, etc.) to/from the vehicle will be intercepted and rerouted through the machine-to-machine platform, and allowed to pass through (e.g., released, forwarded, routed, or otherwise provided) to the target destination, such as the OTT server associated with the vehicle OTT application. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, vehicle computer systems, network access nodes, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein pertaining to connected vehicle network access optimization will be described, according to an illustrative embodiment. It should be understood that the operating environment 100 and the various components thereof have been illustrated for clarity purposes to simplify the manner of discussion. Accordingly, additional and/or alternate components can be made available or otherwise implemented within the operating environment 100 without departing from the embodiments described herein. As such, the manner of discussion is provided such that one of ordinary skill in the technology can implement one or more embodiments described herein.

The operating environment 100 shown in FIG. 1 includes one or more instance of a serving network 102, one or more instances of a network access point 104, a machine-to-machine platform ("M2M platform") 108, a machine-to-machine server ("M2M server") 110, a connected vehicle ("vehicle") 120, a communications network ("network") 130, one or more instances of a network access point 132, and one or more instance of a core server 134. The number of instances shown in FIG. 1 is for illustration purposes only and should not be construed as limiting in any way. Therefore, it is understood that zero, one, two, or more instances of each of the elements of the operating environment 100 shown in FIG. 1 may be provided in various embodiments.

In the operating environment 100 shown in FIG. 1, an instance of the serving network 102 can refer to a radio access network that directly connects an instance of the vehicle 120 to the M2M platform 108, where the M2M platform 108 controls and manages whether a device (e.g., the vehicle 120) can access and utilize servers and services, such as but not limited to, an over-the-top server ("OTT server") 131, the core server 134, and/or a network communication service 138, which are discussed in further detail below. The serving network 102 can include network infrastructure devices that can facilitate communication and messaging to and/or from an instance of the vehicle 120 and/or the network 130. For example, the serving network 102 can include one or more instance of the network access point 104. The network access point 104 can include, but should not be limited to, one or more of a base transceiver station, a wireless router, a femtocell, a Node B, an eNodeB, a gNodeB (i.e., an access point that incorporates New Radio access technology, such as LTE Advanced, and other 5G technology), a multi-standard metro cell node, an optical network terminal, and/or other network nodes or combinations thereof that are capable of providing communication to and/or from the serving network 102. In some embodiments, the serving network 102 may provide an initial point of contact for the vehicle 120. The M2M platform 108 serves as an intermediary that enforces an access policy 144 for use of, and access to, any of the network 130, the OTT server 131, the core server 134, and/or the network communication service 138. As such, the serving network 102 may direct communications from the vehicle 120 to the M2M platform 108 to ensure network service compliance with access policy restrictions pertaining to the use of the network communication service 138, such as only allowing devices to use the network communication service 138 provided that they are identified in an authorized access policy map discussed below.

The M2M platform 108 can include a connectivity management and handling system for supporting communications by various machine-to-machine and Internet of Things ("IoT") devices, such as the vehicle 120 and other wireless communication devices that can connect to, and interact with, the serving network 102. In some embodiments, the M2M platform 108 may be referred to as an IoT platform that supports the serving network 102. In some embodiments, the M2M platform 108 can include one or more instances of an M2M server, such as the M2M server 110. In some embodiments, a communication service provider associated with the network communication service 138 may use the M2M platform 108 to control network traffic that is directed to the network 130 (and/or a core server, such as the core server 134 of the network 130) so that network access and exposure of the network communication service 138 is limited to only those devices that are subscribed or otherwise authorized to utilize and access the network communication service 138. It is understood that the M2M platform 108 can include various virtualized and/or non-virtualized non-generic network infrastructure devices that support and provide functionality for the M2M platform 108, such as the M2M server 110. An example of a computer system that can be configured as an embodiment of the M2M server 110 is discussed with respect to FIG. 6. It is understood that other network infrastructure devices can support the M2M platform 108, such as but not limited to, routers, switches, and any other device discussed with respect to the serving network 102. In various embodiments, an instance of the M2M server 110 can include one or more instances of a processing unit and a memory storage device, such as a processor 111 and a memory 112, respectively. The processor 111 can include one or more instance of a processing unit and/or processing circuitry, which may execute to provide virtualized and/or non-virtualized processing. The processor 111 can include a central processing unit, a graphics processing unit, a system-on-chip, a combination thereof, of the like. The processor 111 can be configured substantially similar to a processing unit discussed with respect to FIG. 6. In some embodiments, the memory 112 can include volatile and/or non-volatile memory implemented in any method or technology for storage of information such as computer-executable instructions, data structures, software program modules, or other data disclosed herein. It is understood that, use of the term "memory" and "computer storage medium" and variations thereof in the claims does not include, and shall not be construed to include, a wave or a signal per se and/or communication media. The memory 112 can include a computer storage device that is configured substantially similar to memory discussed further below with respect to FIG. 6. It should be understood that the examples provided are for illustration purposes only, and therefore should not be construed as limiting in any way.

In various embodiments, the memory 112 can store an authorized access policy map ("AAPM") 114 and a network exposure manager application ("NEMA") 118. In some embodiments, the AAPM 114 can be generated and stored within the M2M platform 108 based on the access policy 144 that corresponds to the network communication service 138. The NEMA 118 can control which devices (e.g., instances of a telematics control unit) are authorized to access the network communication service 138, and in turn the NEMA 118 can control whether one or more instances of a vehicle over-the-top application ("vehicle OTT application") 124 can operate, execute, and/or function on a vehicle head unit ("head unit") 122 of the vehicle 120, specifically because the vehicle OTT application 124 relies on the network communication service 138 to function and maintain execution. Without access by the vehicle OTT application 124 to the network communication service 138 (provided at least in part by the network 130 and/or the serving network 102), execution of the vehicle OTT application 124 cannot be sustained because the vehicle OTT application 124 cannot contact an OTT server, such as the OTT server 131. Further discussion of the AAPM 114 and the NEMA 118 will be provided below. It is understood that any of the serving network 102, the M2M platform 108, and the M2M server 110 may communicate with the vehicle 120, the network 130, and any devices included therein. In some embodiments, the M2M platform 108 may be associated with third party communication providers so as to provide IoT management for the network communication service 138. It is understood that the use of the term "service" is intended to correspond with one or more network operations that support handling of communications and messages (e.g., messages to and/or from the vehicle 120) over the serving network 102 and/or the network 130. Therefore, any use of the term "service" in the claims shall not be construed or interpreted as being direct to, involving, or otherwise including a judicial exception (e.g., an abstract idea, etc.) or any other non-patentable subject matter. It should be understood that the examples provided are for illustration purposes only, and therefore should not be construed as limiting in any way.

In the operating environment 100 shown in FIG. 1, an instance of the vehicle 120 is represented as a car driving along a paved roadway, although this may not necessarily be the case for all embodiments. As used herein, the terms "vehicle" and "connected vehicle" (e.g., the vehicle 120) refers to any ground-based vehicle that includes communication components and/or user equipment capable of sending and/or receiving communications with a network (e.g., the serving network 102 and/or the network 130), where the ground-based vehicle can be configured to transport, carry, direct, and/or facilitate movement of one or more passengers, cargo, and/or objects. By way of example without limitation, an instance of the vehicle 120 can be configured as a car, a truck, a van, a sport utility vehicle, a cross-over vehicle, a motorcycle, a motorized tricycle, a scooter, a go-kart, a golf cart, a fork lift, a bus, a semi-trailer truck, a racing vehicle, a snow-capable vehicle, earth-moving equipment, farming/agriculture equipment, single or multi-wheeled vehicle, combinations thereof, or the like. It is understood that instances of vehicles may use various power/engine mechanisms to provide movement and/or functionality, such as but not limited to motors and/or engines that employ the use of fuel, oil, batteries, combinations thereof, or the like. Although one instance of a vehicle (i.e., the vehicle 120) is illustrated in FIG. 1, it is understood that less than two or more than two instances of a vehicle can be included in various embodiments of the operating environment 100. It should be understood that the examples provided are for illustration purposes only, and therefore should not be construed as limiting in any way.

In some embodiments, an instance of the vehicle 120 can be driven, controlled, directed, or otherwise operated by a person. In some embodiments, an instance of the vehicle 120 may be configured to operate in at least a partially autonomous control mode. In some embodiments, an instance of the vehicle 120 may be configured to operate as a fully autonomous vehicle. In some embodiments, an instance of the vehicle 120 can operate as a "level 3" or "level 4" vehicle as defined by the National Highway Traffic Safety Administration ("NHTSA"). The NHTSA defines a level 3 vehicle as a limited self-driving automation vehicle that enables a driver to cede full control of all safety-critical functions under certain traffic or environmental conditions, and in those conditions to rely heavily on the vehicle to monitor for changes that require transition back to driver control. In a level 3 vehicle, the driver is expected to be available for occasional control, but with sufficiently comfortable transition time. By way of example, a limited self-driving automation vehicle may be available from WAYMO LLC, a subsidiary of ALPHABET INC.; TESLA INC.; and/or the VOLVO CARS CORPORATION. It should be understood that the examples provided are for illustration purposes only, and therefore should not be construed as limiting in any way. The NHTSA defines a level 4 vehicle as a fully self-driving automation vehicle that is designed to perform all safety-critical driving functions and monitor roadway conditions for an entire trip to a destination. Such fully self-driving design anticipates that a user will provide destination or navigation input, but the user is not expected to be available for control at any time during the trip. As such, a level 4 vehicle may include both occupied and unoccupied vehicles. Instances of the vehicle 120 can include any combination of the aforementioned vehicle types and can have any combination of capabilities with regard to autonomy. It is understood that the aforementioned discussion of standards defined by the NHTSA are provided for illustration purposes only, and therefore should not be construed as limiting in any way. It is understood that alternate standards, specifications, and/or definitions used to describe levels of autonomous driving modes may be developed and/or adopted by various industry groups and/or companies, such as but not limited to the Society of Automotive Engineers ("SAE") International, the Federal Communications Commission ("FCC"), the Institute of Electrical and Electronics Engineers ("IEEE"), or other industry group. Therefore, it should be understood that the examples provided are for illustration purposes only, and therefore should not be construed as limiting in any way.

In some embodiments, an instance of the vehicle 120 can include a vehicle head unit ("head unit"), such as the vehicle head unit 122, and a telematics control unit ("TCU") 128. The head unit 122 can include one or more instances of a display device ("display") for presenting a user interface that can provide visual images. The head unit 122 also can include (and/or be communicatively coupled to) input and output components that provide audio output and receive input from a user, such as via one or more speakers and/or microphones. In some embodiments, an input 127 can be provided to the head unit 122 via audio input, visual input, touch input, combinations thereof, or the like. In some embodiments, the head unit 122 can be configured to include (and/or be communicatively coupled to) a heads up display, a vehicle information display, a console display, safety mechanisms (e.g., blind-spot sensors, crash avoidance, lane detection, auto-steering, etc.), a combination thereof, or any other audio, visual, and/or haptic feedback mechanism that can communicate or convey information to a user associated with the vehicle 120. In some embodiments, one or more instances of information and/or commands can be presented to a user of the vehicle 120 through visual presentation and/or audio presentation via one or more instance of the head unit 122. In some embodiments, the head unit 122 and/or the TCU 128 can be configured at least similar to a user equipment discussed with respect to FIG. 7. For example, various embodiments of the head unit 122 and/or the TCU 128 can include elements discussed therein, such as one or more instance of a processor, memory, communications components, and the like. In some embodiments, the head unit 122 and/or the TCU 128 can be configured substantially similar to a vehicle head unit and a TCU discussed with respect to FIG. 2. For clarity, aspects of elements from a user equipment that can be included within the head unit 122 and/or the TCU 128 will be provided with respect to FIGS. 2 and 7. It should be understood that the examples provided are for illustration purposes only, and therefore should not be construed as limiting in any way.

In various embodiments, the head unit 122 can include one or more instances of a vehicle OTT application, such as the vehicle OTT application 124. The vehicle OTT application 124 can be stored in, and executed from, a memory storage device, such as a vehicle memory discussed with respect to FIG. 2. Examples of an instance of the vehicle OTT application 124 can include, but should not be limited to, applications pertaining to social media, visual and/or audio calls, messaging, streaming media content (audio and/or video), geolocation mapping and/or traffic, news, weather, vehicle information, safety, or any other OTT application that can interact with and/or utilize a network communication service, such as the network communication service 138, which will be discussed below in further detail. It is understood that the examples provided are for illustration purposes only, and therefore should not be construed as limiting in any way. An instance of the vehicle OTT application 124 can be associated with an application identifier 126. Each instance of the application identifier 126 can be a unique string that is associated with the particular vehicle OTT application 124. The application identifier 126 can be included in messages to/from the vehicle 120. The application identifier 126 can be used to determine whether the corresponding vehicle OTT application 124 is authorized to access the network communication service 138 via the vehicle 120. In some embodiments, the input 127 can trigger the head unit 122 to launch and/or execute an instance of the vehicle OTT application 124. In some embodiments, the input 127 can be provided to the head unit 122 while the vehicle OTT application 124 is already executing. The vehicle OTT application 124 may seek to connect and communicate with the OTT server 131 because the OTT server 131 may provide data, content, interfaces, and any other packet information that allows use and operation of the vehicle OTT application 124. Further discussion of an instance of the OTT server 131 is provided below. It is understood that the examples provided are for illustration purposes only, and therefore should not be construed as limiting in any way.

Figure 2:
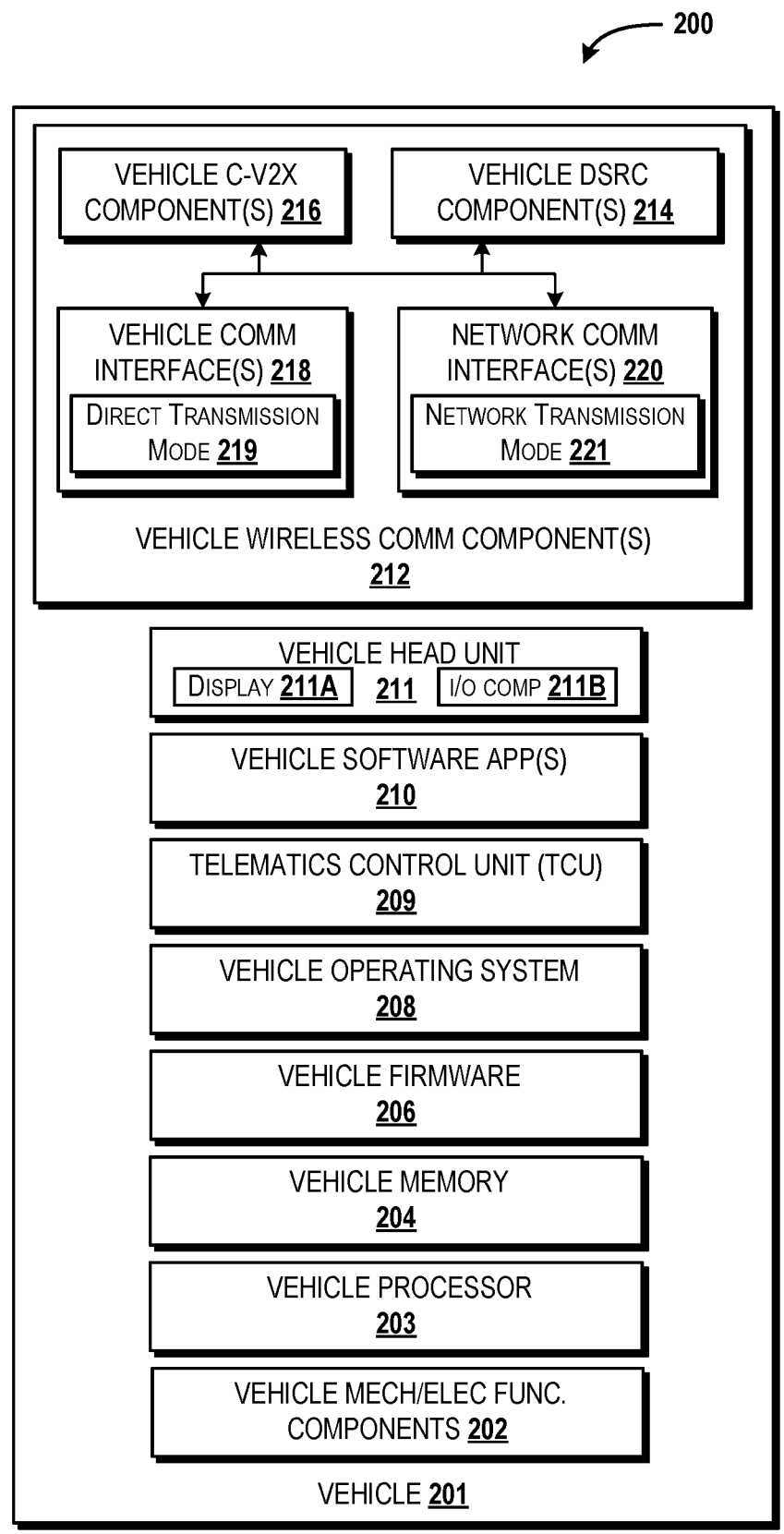
FIG. 2 is a block diagram illustrating aspects of a vehicle capable of implementing aspects of the embodiments disclosed herein.

In various embodiments, the TCU 128 can be configured substantially similar to a TCU discussed with respect to FIG. 2. The TCU 128 can send, receive, and/or control communication flow to/from the head unit 122. The TCU 128 can include communication components and circuitry that provide and support communicative coupling with other devices and networks, such as but not limited to, the serving network 102, the network 130, the M2M platform 108, and the core server 134. The TCU 128 can indicate an amount of signal strength, available network connections, and other information pertaining to communication to/from the vehicle 120. In some embodiments, information provided by the TCU 128 can be presented to a user via the head unit 122. The TCU 128 can expose one or more network communication interfaces that provide communication links to various network access points, such as the network access points 104 and/or 132. The TCU 128 can provide and be associated with a TCU identifier 128A. The TCU identifier 128A can be unique to the vehicle 120 and/or the TCU 128, and therefore be used by network infrastructure of the serving network 102 and/or the network 130 to determine whether the vehicle 120 is authorized to access and utilize OTT applications and network services, such as the vehicle OTT application 124 and/or the network communication service 138. In some embodiments, the TCU identifier 128A may include and/or correspond with an international mobile equipment identity, a subscriber identity module number, an electronic serial number, a combination thereof, or another identifier assigned or associated with the TCU 128. It is understood that the examples provided are for illustration purposes only, and therefore should not be construed as limiting in any way.

In the operating environment 100 shown in FIG. 1, an instance of the network 130 can be in communication with one or more instances of the serving network 102, the vehicle 120, user equipment, other network devices, combinations thereof, or the like. The network 130 can include one or more instances of the network access point 132 and other network infrastructure devices. The network access point 132 can be configured at least similar to one or more embodiments of the network access point 104 discussed above. In some embodiments, the network 130 can refer to and/or include a core network that has network devices, servers, services, applications, and functions that support legacy, current, and/or future standards, such as 3G, 4G, LTE, 5G, or later architecture. For example, in some embodiments, the network 130 can include, support, and/or provide one or more of an evolved universal mobile telecommunications system ("UMTS"), an evolved packet core ("EPC"), a terrestrial radio access ("E-UTRAN") device, a mobility management entity ("MME"), a serving/packet data network ("PDN) gateway ("S/PGW"), a home subscriber server ("HSS"), a mobile edge computing ("MEC") unit, a Policy & Charging rules function ("PCRF"), an Internet Protocol Multimedia Subsystem ("IMS"), a combination thereof, and/or any other systems, devices, and/or functions that may be included in one or more of 3G, 4G, LTE, 5G, or later network architecture and standards. In some embodiments, the network 130 may be referred to as a "core network" that provides a software defined network ("SDN") architecture to support functionality and communication via 5G, New Radio, and/or other standards and protocols via the implementation of centralized and/or distributed network host devices (which may be virtualized and/or non-virtualized).

In some embodiments, the network 130 can include one or more instance of a core server, such as the core server 134. The core server 134 can include a processor 135 and a memory 136. The processor 135 can include one or more instance of a processing unit and/or processing circuitry, which may execute to provide virtualized and/or non-virtualized processing. The processor 135 can include a central processing unit, a graphics processing unit, a system-on-chip, a combination thereof, of the like. The processor 135 can be configured substantially similar to a processing unit discussed with respect to FIG. 6. In some embodiments, the memory 136 can include volatile and/or non-volatile memory implemented in any method or technology for storage of information such as computer-executable instructions, data structures, software program modules, or other data disclosed herein. It is understood that, use of the term "memory" and "computer storage medium" and variations thereof in the claims does not include, and shall not be construed to include, a wave or a signal per se and/or communication media. The memory 136 can include a computer storage device that is configured substantially similar to memory discussed further below with respect to FIG. 6. It should be understood that the examples provided are for illustration purposes only, and therefore should not be construed as limiting in any way.

In some embodiments, the core server 134 can reside in, and/or form a portion of, the network 130 and can, at least partially, support, host, or otherwise provide the network communication service 138 so as to enable various devices (e.g., the TCU 128 of the vehicle 120) to access and communicate with the OTT server 131 via the serving network 102 and/or the network 130. In some embodiments, the core server 134 can be configured to provide and/or support a policy control function ("PCF") 145 and an access and mobility function ("AMF") 146. In some embodiments, the network 130 and/or the core server 134 can, at least partially, support, host, or otherwise provide access to one or more of a session management function, an access and mobility management entity, an authentication server function, a user data management function, a user plane function, a network exposure function, unified data management ("UDM"), an application function ("AF"), an enhanced mobile broadband system ("eMBBS"), a combination thereof, and/or other applications, systems, and/or functions that may support a network architecture. It should be understood that the examples provided are for illustration purposes only, and therefore should not be construed as limiting in any way.

In some embodiments, the core server 134 can store an instance of computer readable instructions so as to configure one or more processors to perform operations. In some embodiments, the computer readable instructions can be provided by a control application 140 that is stored in the memory 136. The core server 134 can be associated with a communication service provider that supports and/or facilitates the operation of the network communication service 138. The network communication service 138 enables user equipment and devices (e.g., the TCU 128 of the vehicle 120) to communicate over the serving network 102 and/or the network 130 so as to provide access and communicative coupling to devices and services associated with the vehicle OTT application 124, such as the OTT server 131. The network communication service 138 can provide and include transport layer functionality across a network, such as the serving network 102 and/or the network 130, so that user equipment and devices (e.g., the vehicle 120) can engage in wireless and/or wired communication coupling to access services and devices associated with the vehicle OTT application 124, such as the OTT server 131 that can provide a content data stream ("content stream") 166 to the vehicle OTT application 124 executing on the vehicle 120. The content stream 166 can include a successive, associated group of data packets that uniquely configure and transform a processor, display device, and other hardware resources of the vehicle 120 (e.g., the head unit 122 and any other elements discussed with respect to FIG. 2) for continued execution of the vehicle OTT application 124. In various embodiments, the content stream 166 can provide one-way and/or two-way audio, video, images, user interfaces, text, combinations thereof, or any other information within data packets for operation by the vehicle 120 and/or the head unit 122. The content stream 166 may be provided to a corresponding instance of the vehicle OTT application 124 only after the M2M platform 108 has determined that the corresponding vehicle 120 (and thus the TCU 128 and/or head unit 122) is authorized to use the network communication service 138. For example, after the M2M platform 108 redirects the vehicle 120 to the network service portal 142 (e.g., via an access redirect request discussed below) so as to bypass the M2M platform 108 and cause the TCU 128 to obtain authorization to the network communications service 138, the AAPM 114 can be updated (i.e., reconfigured and instantiated with an authorization identifier that reflects the TCU 128), thereby authorizing the vehicle OTT application 124 to contact the OTT server 131 via the M2M platform 108 (which can intercept all communications as an intermediary to determine which communications should be allowed to pass through the serving network 102 and which communications should be blocked based on the particular vehicle from which the communication is sent). As such, if the vehicle 120 is authorized to use the network communication service 138 (e.g., based on the vehicle 120 being identified in the AAPM 114), then the content stream 166 can be generated by the OTT server 131, routed through the M2M platform 108, and to the TCU 128 and the head unit 122 of the vehicle 120. It is understood that the vehicle 120 can continue to use the network communication service 138 while the vehicle 120 is within communicative coupling range of a corresponding network (e.g., the serving network 102 and/or the network 130) and while the vehicle 120 is authorized on the AAPM 114 to use the network communication service 138, thereby allowing for pass-through communications via the M2M platform 108. A communication service provider associated with the network communication service 138 can limit, manage, and/or control the use of, and access to, the serving network 102 and/or network 130 that provides a network path to the OTT server 131.

In various embodiments, the network 130 also can include one or more instance of the OTT server 131. The OTT server 131 can be associated with an instance of the vehicle OTT application 124. The OTT server 131 can provide content and data (e.g., a content stream of data packets and/or individual responses to requests) to the vehicle OTT application 124 via the M2M platform 108 because the M2M platform 108 may enforce the access policy 144 on behalf of the core server 134. For example, in an embodiment, the vehicle OTT application 124 may execute streaming audio content that is provided by the OTT server 131. Any of the head unit 122, the vehicle OTT application 124, and the TCU 128 may seek to communicate with the OTT server 131 so that the vehicle OTT application 124 can execute and/or maintain functionality for providing output within the vehicle 120. However, access to the OTT server 131 may depend on the vehicle 120 (and/or one or more devices therein such as the TCU 128, the head unit 122, etc.) being authorized to use the network communication service 138 so that communications from the vehicle 120 can be routed to the OTT server 131, which in turn may be hosted by the network 130.

Use of the network communication service 138 that enables access to the OTT server 131 may be enforced by the M2M platform 108 and/or the M2M server 110 based on the AAPM 114 and/or an access policy, such as the access policy 144. The control application 140 can create and/or define an instance of the access policy 144, where the access policy 144 corresponds with access to the network communication service 138. The access policy 144 can be stored in network-accessible memory, such as the memory 136. The access policy 144 may be defined and stored in a format that is readable by the control application 140, such as a data structure format, an executable routine, or other computer-executable and/or readable instructions. The access policy 144 can indicate parameters, rules, and/or instructions that must be met in order to allow and/or authorize use of the network communication service 138. For example, in some embodiments, the access policy 144 can instruct or otherwise configure network infrastructure (e.g., the network access point 104, the M2M platform 108, etc.) such that communications (e.g., messages and data) to and/or from any of the vehicle OTT application 124, the head unit 122, the TCU 128, the vehicle 120, and/or the OTT server 131 are to be routed through the M2M platform 108 so that exposure and use of the network communication service 138 can be controlled to maintain network security.

In various embodiments, the access policy 144 may require that in order for a device to be authorized for ongoing communicative coupling with the serving network 102 and/or the network 130 (including communicating with the OTT server 131), the device must have or otherwise be associated with an instance of an equipment profile 148 that reflects an active subscription with the communication service provider. An instance of the equipment profile 148 can indicate that a user equipment and/or device (e.g., personal mobile phones, tablets, the TCU 128 of the vehicle 120 etc.) is authorized to use and/or have access to the network communication service 138 by having and recording an identifier associated with the device, such as an instance of a known TCU identifier 149. For example, a user associated with the vehicle 120 may have a user equipment (e.g., a personal mobile phone) that is subscribed to the network communication service 138. A network service portal 142 can be associated with the network communication service 138. The network service portal 142 can be hosted by the core server 134 (or any other computer system associated with the network communication service 138). The network service portal 142 can provide a web page, application, or other user interface by which the vehicle 120 can obtain or otherwise become permitted or otherwise authorized to use the network communication service 138. In some embodiments, a user associated with the vehicle 120 may have to provide an instance of the input 127 to the head unit 122 so as to confirm that the vehicle 120 will abide by the access policy 144, thereby causing the control application 140 to create an instance of an equipment profile 148 for the TCU 128 of the vehicle 120. If an equipment profile, such as the equipment profile 148, associated with the user of the vehicle 120 already exists, then the control application 140 can obtain that instance of the equipment profile 148 and instantiate an identifier that reflects the identity of the TCU 128 (or another device) of the vehicle 120, such as the known TCU identifier 149. Instances of the equipment profile 148 can be stored on the memory 136. In some embodiments, the equipment profile 148 may be part of a user account profile and/or can be linked to a subscription associated with the user and one or more devices that are authorized and permitted to engage in communicative coupling via the network communication service 138. An instance of the equipment profile 148 can be associated with one or more corresponding device that is authorized to use the network communication service 138. For example, if a user has a mobile phone that is subscribed and authorized to use the network communication service 138, then the mobile phone will have (or be associated with) an instance of the equipment profile 148 that provides an identifier associated with the user's mobile phone (e.g., a subscriber identity module identifier). In some embodiments, one instance of the equipment profile 148 may store and identify multiple devices which are associated with a shared network account and/or subscription to the network communication service 138. For example, in some embodiments, the user may also be associated with the vehicle 120, where the vehicle 120 is capable of wireless communication via use of the TCU 128. In some embodiments, prior to launching the vehicle OTT application 124, the user may visit a network representative of the customer service provider and may initiate authorization to setup access to the network communication service 138 before the vehicle 120 is in operation. However, a user may desire to enable the vehicle 120 to engage in communicative coupling (e.g., to allow the vehicle OTT application 124 to connect with the OTT server 131) without going to see a network representative to manually setup the network communication service 138. Although the user may launch the vehicle OTT application 124 and desire to access and use the network communication service 138 with the vehicle 120, an instance of the equipment profile 148 may not initially include an instance of a known TCU identifier 149 for the TCU 128 (at the time in which the vehicle OTT application 124 was launched via an instance of the input 127), and therefore the M2M platform 108 and/or the core server 134 may limit or otherwise prevent the TCU 128 of the vehicle 120 from accessing and using the network communication service 138, thereby preventing the vehicle OTT application 124 from making contact with the OTT server 131. The TCU 128 of the vehicle 120 may be permitted to access and use the network communication service 138 only after an instance of the equipment profile 148 stores an instance of the known TCU identifier 149 for the TCU 128, and the M2M platform 108 becomes aware that the vehicle 120 is authorized to use the network communication service 138 (e.g., the NEMA 118 instantiating the AAPM 114 with an instance of an authorized identifier 116 that reflects the TCU identifier 128A, and thus the TCU 128 of the vehicle 120, as further discussed below). The known TCU identifier 149 may be substantially similar to the TCU identifier 128A, and therefore can identify the vehicle 120 and/or the TCU 128 associated with the vehicle 120. The TCU identifier 128A (and thus also an instance of the known TCU identifier 149) can refer to a unique identifier (e.g., an equipment identifier) for the TCU 128 that operates in the vehicle 120.

The M2M platform 108 can enforce the access policy 144 by confirming whether a device is authorized to use the network communication service 138. Specifically, the access policy 144 can indicate that the network communication service 138 is allowed to be accessed and/or utilized only by devices (e.g., the TCU 128 of the vehicle 120) that have an instance of an identifier (e.g., the known TCU identifier 149) that is associated with an instance of the equipment profile 148. The M2M platform 108 can know, and/or be informed, of the state of the instance of the equipment profile 148 via the AAPM 114. The AAPM 114 can indicate which devices should be allowed to use the M2M platform 108 to access the network communication service 138 based on whether an instance of an authorized identifier 116 is present within the AAPM 114. An instance of the authorized identifier 116 provides an identity of a device that is authorized to access the network communication service 138 through the M2M platform 108. Instances of authorized identifiers (e.g., any of authorized identifiers 116A-N) can point to, or otherwise identify, a corresponding instance of the known TCU identifier 149 that is present and recorded within the equipment profile 148 on the core server 134. The presence of an authorized identifier (e.g., any of authorized identifiers 116A-N) within the AAPM 114 indicates that a corresponding device is authorized to use the network communication service 138, and therefore the M2M platform 108 can allow the corresponding device (e.g., the TCU 128 of the vehicle 120) to use the network communication service 138 and M2M platform 108 in order to connect with the OTT server 131. Therefore, if a message that is received by the M2M platform 108 has an identifier (e.g., the TCU identifier 128A) that matches one of the authorized identifiers 116A-N of the AAPM 114, then the corresponding device which sent the message (e.g., the TCU 128 of the vehicle 120) would be authorized to use the network communication service 138 and access the OTT server 131 via the M2M platform 108. If, however, the message includes an identifier that does not match any of the authorized identifiers 116A-N of the AAPM 114, then the corresponding device which sent the message would not be authorized to use the network communication service 138, thereby blocking messages from the device from being routed through the M2M platform 108 to the OTT server 131. For clarity, a brief discussion of an example communication flow will be provided with respect to FIG. 1. It should be understood that the examples provided are for illustration purposes only, and therefore should not be construed as limiting in any way.

In various embodiments, the user of the vehicle 120 may desire to execute the vehicle OTT application 124 to provide output (e.g., audio and/or video data) via the head unit 122. The user can provide an instance of the input 127 to the head unit 122 to initiate execution of the vehicle OTT application 124. The head unit 122 can determine that the vehicle OTT application 124 relies on a network connection to receive data for the vehicle OTT application 124 (e.g., media data associated with an over-the-top service provided by the OTT server 131). The head unit 122 can generate an instance of an access probe message 150 that requests access to the network communication service 138. The access probe message 150 can include a probe uniform resource locator ("probe URL") 152. The probe URL 152 can refer to a network address string that is directed to a target destination that facilitates network communication for execution and operation of the vehicle OTT application 124. Examples of the target destination can include the network communication service 138, the core server 134 associated with the network communication service 138, and/or the OTT server 131. The access probe message 150 can also include the TCU identifier 128A associated with the TCU 128 of the vehicle 120. At the time the input 127 is received by the head unit 122, the head unit 122 may not be aware of network reachability—that is, whether the TCU 128 of the vehicle 120 is authorized or otherwise permitted to use the network communication service 138. The head unit 122 can pass or otherwise provide the access probe message 150 to the TCU 128. The TCU 128 can establish a connection with the serving network 102, and provide the access probe message 150 to the serving network 102.

The network access point 104 can relay the access probe message 150 to the M2M platform 108 of the serving network 102. The NEMA 118 may be executing on one or more servers of the M2M platform 108 (e.g., the M2M server 110). The NEMA 118 may receive and analyze the access probe message 150. The NEMA 118 may determine that the access probe message 150 is requesting forwarding to a target destination, such as one or more of the core server 134, the network communication service 138, and/or the OTT server 131. Instead of forwarding the access probe message 150 as requested, the NEMA 118 may prevent the access probe message 150 from being forwarded in order to confirm whether the TCU 128 of the vehicle 120 is authorized to access the network communication service 138. The NEMA 118 may access the AAPM 114 and compare the TCU identifier 128A against the authorized identifiers 116A-N to determine whether a match exists. In some embodiments, if the AAPM 114 indicates that one of the authorized identifiers 116A-N matches or otherwise corresponds with the TCU identifier 128A from the access probe message 150, then the TCU 128 of the vehicle 120 is authorized to use the network communication service 138, so the NEMA 118 permits the access probe message 150 (or any other message) to be forwarded on from the M2M platform 108 to the target destination. In another embodiment, if none of the authorized identifiers 116A-N from the AAPM 114 match or otherwise correspond with the TCU identifier 128A, then the TCU 128 is not authorized to access the network communication service 138.

In embodiments where the NEMA 118 determines that the TCU 128 of the vehicle 120 is not authorized to use the network communication service 138, the NEMA 118 can generate an access redirect command 154. The access redirect command 154 can instruct, via a redirect instruction, the head unit 122 of the vehicle 120 to bypass the M2M platform 108 so as to enable access to the network communication service 138 via the network service portal 142. The access redirect command 154 can include a redirect instruction 156. In some embodiments, the access redirect command 154 can conform to a Hypertext Transfer Protocol (HTTP) specification status code, such as but not limited to one or more of HTTP status code 302, 303, 307, or another status code discussed with respect to a standards document as understood by one of skill in the technology. The redirect instruction 156 can include a redirect URL 158 that points to the network service portal 142 associated with the network communication service 138. The redirect instruction 156 can impart the redirect URL 158 to the head unit 122 and/or the TCU 128 so that the M2M platform 108 is bypassed and access to the network communication service 138 can be enabled or otherwise obtained directly from the core server 134 via the network service portal 142, without being routed through the M2M platform 108. The NEMA 118 can provide the access redirect command 154 to the TCU 128 of the vehicle 120. In some embodiments, the access redirect command 154 (and/or any other message discussed herein that is sent from and/or received by the vehicle 120) can be configured according to a vehicle-to-network message format, such as but not limited to one or more of messaging in conformance with PC5, 802.11p, UU, LTE-V2X, or another standard that conforms with vehicle communications standards as understood by one of ordinary skill in the technology. In some embodiments, the access redirect command 154 can provide the vehicle 120 (and thus the TCU 128) with a one-time bypass of the M2M platform 108 so as to enable the vehicle 120 to become authorized to use the network communication service 138 by contacting the core server 134 directly to access the network service portal 142 by bypassing the M2M platform 108. Thus, if the M2M platform 108 determines (after previously providing the access redirect command 154 to the vehicle 120) that the vehicle 120 continues to be unauthorized to use the network communication service 138, then any communications from the vehicle 120 can be intercepted and rerouted to the M2M platform 108 so as to block and/or prevent the communications from reaching the target destination (e.g., the OTT server 131), thereby preventing the OTT server 131 from providing the content stream 166 to the head unit 122 until the AAPM 114 indicates that the vehicle 120 is authorized to use the network communication service 138.

In various embodiments, the TCU 128 may receive the access redirect command 154. In some embodiments, the TCU 128 may relay or otherwise inform the head unit 122 of the access redirect command 154 and any data included therein, such as the redirect instruction 156 and the redirect URL 158. The TCU 128 and/or the head unit 122 can generate an access redirect request message ("access redirect request") 160 based on the access redirect command 154 and the redirect instruction 156 from the M2M platform 108. The access redirect request 160 can include the redirect URL 158 that redirects the TCU 128 to contact the network service portal 142 so as to bypass the M2M platform 108 and enable the network communication service 138. The TCU 128 can send or otherwise provide the access redirect request 160 to the core server 134 of the network 130 that hosts the network service portal 142. The access redirect request 160 can be routed from a network access point (e.g., any of the network access points 104, 132) to the core server 134 such that the access redirect request 160 is not intercepted by the M2M platform 108 and M2M server 110, thereby allowing the TCU 128 to obtain access and authorization to the network communication service 138 via the network service portal 142. In some embodiments, the network service portal 142 can provide one or more user interfaces to the head unit 122 so as to enable the vehicle 120 to obtain authorization to use and access the network communication service 138. In various embodiments, the one or more user interfaces may be provided to the TCU 128 and/or the head unit 122 in one or more instance of a network service portal response 162. For example, in some embodiments, the access redirect request 160 can include an instance of the TCU identifier 128A associated with the TCU 128. In some embodiments, while the vehicle 120 is connected with the network service portal 142, the user can provide an instance of input to the head unit 122 (and/or the TCU 128) that indicates permission for the control application 140 (on the core server 134) to add the vehicle 120 (and/or the TCU 128) to a corresponding instance of the equipment profile 148 so as to indicate that the TCU 128 is an authorized device that is permitted to use the network communication service 138. In some embodiments, the user may also grant a communication service provider permission to change and/or upgrade a data plan for use of the vehicle 120 with the network communication service 138. In various embodiments, the control application 140 can receive input from the user (e.g., via the TCU 128 and/or the control application 140 engaging in one or more instances of the access redirect request 160 and/or the network service portal response 162) requesting access to and use of the network communication service 138 by the vehicle 120. The control application 140 can grant and enable the TCU 128 of the vehicle 120 to access the network communication service 138 by instantiating the known TCU identifier 149 within the equipment profile 148 associated with the vehicle 120 and/or user of the vehicle 120. The known TCU identifier 149 that is recorded in the equipment profile 148 matches, corresponds to, or otherwise reflects the TCU identifier 128A associated with the TCU 128 and the vehicle 120 which is being granted permission to use the network communication service 138. To clarify, an instance of the known TCU identifier 149 that identifies (or otherwise corresponds with) the vehicle 120 (and/or the TCU 128) did not exist (or was not stored) in the equipment profile 148 when the vehicle 120 was unauthorized to use the network communication service 138 (i.e., prior to the TCU 128 of the vehicle 120 being permitted to engage in use of the network communication service 138, and thus yet not permitted to contact the OTT server 131). As such, the presence of the known TCU identifier 149 within the equipment profile 148 indicates that a corresponding device (e.g., the TCU 128 of the vehicle 120) is permitted and authorized to use the network communication service 138. In some embodiments, the TCU 128 may be informed that the vehicle 120 is authorized to access the network communication service 138 via the network service portal response 162.

In various embodiments, when the equipment profile 148 is updated to store an identifier (e.g., the known TCU identifier 149) of a device that is now authorized to access the network communication service 138, the control application 140 may send an access update message 170 to the NEMA 118 of the M2M platform 108. The NEMA 118 can extract and analyze the known TCU identifier 149 from the access update message 170, and create an instance of the authorized identifier 116 within the AAPM 114 (e.g., any of the authorized identifiers 116A-N) to correspond with, and identify, the known TCU identifier 149. As such, each instance of the authorized identifiers 116A-N can correspond with and represent an identifier stored in an instance of the equipment profile 148 (e.g., the authorized identifier 116B being created and/or configured to represent the known TCU identifier 149 that is associated with the TCU 128, the TCU identifier 128A, and the vehicle 120). When the vehicle 120 initially sends the access probe message 150 to the M2M platform 108, the NEMA 118 may not recognize the vehicle 120 because the AAPM 114 does not indicate that any of the authorized identifiers 116A-N belong to the TCU 128 of the vehicle 120. Therefore, the M2M platform 108 may deny the vehicle 120 access to the network communication service 138 and prevent the vehicle OTT application 124 from using the M2M platform 108 to access the OTT server 131. Yet once one of the authorized identifiers 116A-N within the AAPM 114 matches or otherwise corresponds with the TCU identifier 128A provided by the TCU 128, then the M2M platform 108 may allow messages from the vehicle 120 to pass through the M2M platform 108 and use the network communication service 138.

In some embodiments, once the vehicle 120 is granted permission to use and engage in the network communication service 138, the TCU 128 may send a subsequent access probe message 150'. The subsequent access probe message 150' may include another instance of the probe URL 152, which is illustrated as probe URL 152'. The subsequent access probe message 150' may include the TCU identifier 128A that is associated with the TCU 128 and the vehicle 120. The M2M platform 108 can determine that one of the authorized identifiers 116A-N within the AAPM 114 corresponds with the TCU identifier 128A, and therefore the M2M platform 108 can grant the vehicle 120 access to the network communication service 138. In some embodiments, the subsequent access probe message 150' can be forwarded on to a target destination, such as one or more of the core server 134 and/or the OTT server 131 via the M2M platform 108. In some embodiments, the core server 134 and/or OTT server 131 can receive the message sent from the vehicle 120 via the M2M platform 108 (e.g., the access probe message 150 and/or the subsequent access probe message 150') and, in response, generate an access probe response 164 that informs the vehicle 120 that the TCU 128 and the vehicle OTT application 124 are permitted or otherwise authorized to connect with the OTT server 131 because the vehicle 120 is authorized to use the network communication service 138. In some embodiments, the access probe response 164 can be sent from the core server 134 and/or the OTT server 131 to the vehicle 120 via the M2M platform 108 (i.e., by the M2M platform 108 being an intermediary point of access policy enforcement). In some embodiments, an instance of the access probe response 164 can be provided directly to the vehicle 120 so as to bypass the M2M platform 108, where the access probe response 164 can inform the vehicle 120 that the head unit 122 and/or the TCU 128 is authorized to use the network communication service 138. In some embodiments, the content stream 166 may be provided to the vehicle OTT application 124 after a subsequent instance of the access probe message 150 is sent (e.g., an instance of the subsequent access probe message 150') to the M2M platform 108, which determines that the vehicle 120 is now authorized to use the network communication service 138. In some embodiments, when one or more of the M2M platform 108 determines that the vehicle 120 is authorized to use the network communication service 138, any previous and/or current communications that are directed a target destination (e.g., to the OTT server 131) will no longer be blocked, but instead can be released, routed, and provided to the target destination (e.g., the OTT server 131). The M2M platform 108 can continue to intercept communications (e.g., the content stream 166) that are directed to and/or sent from the vehicle 120 associated with the vehicle OTT application 124, thereby enabling enforcement of the access policy and optimization of network resources because communications are routed to their final destination only when the corresponding vehicle 120 is authorized to use the network communication service 138.

In some embodiments, if the vehicle 120 and/or TCU 128 violates one or more parameters of the access policy 144 (e.g., exceed network usage, non-payment of service fee, nefarious network attacks from the vehicle 120, etc.), the control application 140 may lock or otherwise prevent the vehicle 120 from using the network communication service 138 by removing the known TCU identifier 149 from the equipment profile 148. In turn, the NEMA 118 may remove the corresponding authorized identifier from the AAPM 114 so that when the vehicle 120 attempts to contact the OTT server 131 and/or the core server 134 to use the network communication service 138, the M2M platform 108 can provide an access denied response 153 to inform the vehicle 120 that access to the network communication service 138 has been withdrawn. It should be understood that the examples provided are for illustration purposes only, and therefore should not be construed as limiting in any way.

FIG. 1 illustrates the operating environment 100 having one instance of the serving network 102, the network access point 104, the M2M platform 108, the M2M server 110, the processor 111, the memory 112, the AAPM 114, the authorized identifiers 116A-N, the NEMA 118, the vehicle 120, the head unit 122, the vehicle OTT application 124, the application identifier 126, the input 127, the TCU 128, the TCU identifier 128A, the network 130, the OTT server 131, the network access point 132, the core server 134, the processor 135, the memory 136, the network communication service 138, the control application 140, the network service portal 142, the access policy 144, the PCF 145, the AMF 146, the equipment profile 148, the known TCU identifier 149, the access probe message 150, the probe URL 152, the subsequent access probe message 150', the probe URL 152', the access redirect command 154, the redirect instruction 156, the redirect URL 158, the access redirect request 160, and the network service portal response 162, and access probe response 164, and a content stream 166. It should be understood, however, that some implementations of the operating environment 100 can include zero, one, or more than one instances of the above listed elements shown in FIG. 1. As such, the illustrated embodiment of the operating environment 100 is understood to be illustrative and should not be construed as being limiting in any way.

Turning now to FIG. 2 with continued reference to FIG. 1, a block diagram 200 illustrating an instance of a vehicle 201 and aspects thereof will be described, according to an illustrative embodiment. It is understood that one or more instances of the vehicle 120 illustrated and discussed with respect to FIG. 1 can be configured substantially similar to the vehicle 201 shown and discussed with respect to FIG. 2. The vehicle 201 shown in FIG. 2 is illustrated for purposes of clarity of discussion, and therefore is provided as an example. It is understood that zero, one, or more than one instances of the components discussed herein with respect to the vehicle 201 may be implemented in various embodiments. As such, the examples provided are for illustration purposes only, and therefore should not be construed as limiting in any way. The illustrated vehicle 201 includes vehicle mechanical/electrical function components 202, a vehicle processor 203, a vehicle memory 204, a vehicle firmware 206, a vehicle operating system 208, a telematics control unit 209, one or more vehicle software application 210, a vehicle head unit 211, a display 211A, an input/output component 211B, a vehicle wireless communications component 212, an instance of a vehicle communication interface 218 that supports a direct transmission mode 219, an instance of the network communication interface 220 that supports the network transmission mode 221, a vehicle dedicated short-range communications ("DSRC") component 214, and a cellular vehicle-to-anything ("C-V2X") component 216. Each of these components will now be described in detail. It is understood that the term vehicle-to-anything ("V2X") refers to a vehicle's communication ability (e.g., the vehicle 201) through components (e.g., a telematics control unit) that are configured to communicate with one or more network or network infrastructure, such as the serving network 102, the M2M platform 108, the network 130, the OTT server 131, the core server 134, or the like. In some embodiments, a communication that is sent to and/or from a vehicle may be referred to as the implementation of vehicle-to-everything ("V2X") communications, which can include one or more of vehicle-to-vehicle ("V2V") communications, vehicle-to-infrastructure ("V2I") communications, vehicle-to-network ("V2N") communications, and/or vehicle-to-pedestrian ("V2P") communications, and may facilitate communicative coupling between vehicles, infrastructure, a network, and/or pedestrians, respectively. It is understood that the examples provided are for illustration purposes only, and therefore should not be construed as limiting in any way.

The vehicle mechanical/electrical function components 202 can include mechanisms, circuitry, elements, and/or components of the vehicle 201 that enable the vehicle to function and operate. For example, one or more instances of the vehicle mechanical/electrical function components 202 can include, an engine, a transmission, a braking system, a transmission control unit, an engine control unit, a battery, an electrical system, a safety system, a heating ventilation and air conditioning system, a lighting system, a sensor system (e.g., a lane detection system, crash avoidance system, etc.), or any other component or element that may facilitate function of the vehicle 201 and/or support one or more of the operations discussed herein.

The vehicle processor 203 can include one or more hardware components that perform computations to process data, and/or to execute computer-executable instructions of one or more application programs such as the vehicle software application(s) 210, one or more operating systems such as the vehicle operating system 208, other software, and/or the vehicle firmware 206. The vehicle processor 203 can include one or more central processing units ("CPUs") and/or engine control units ("ECU") configured with one or more processing cores. The vehicle processor 203 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the vehicle processor 203 can include one or more discrete GPUs. In some other embodiments, the vehicle processor 203 can include CPU, ECU, and/or GPU components that are configured in accordance with a co-processing CPU/GPU computing model, wherein the sequential part of an application executes on the CPU and the computationally-intensive part is accelerated by the GPU. The vehicle processor 203 can include one or more system-on-chip ("SoC") components along with one or more other components illustrated as being part of the vehicle 201, including, for example, the vehicle memory 204, the vehicle wireless communications component 212, the DSRC component 214, or some combination thereof. In some embodiments, the vehicle processor 203 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The vehicle processor 203 can be or can include one or more hardware components architected in accordance with an ARM architecture, available for license from ARM HOLDINGS of Cambridge, United Kingdom. Alternatively, the vehicle processor 203 can be or can include one or more hardware components architected in accordance with an x86 architecture, such an architecture available from INTEL CORPORATION of Mountain View, Calif., and others. Those skilled in the technology will appreciate the implementation of the vehicle processor 203 can utilize various computation architectures, and as such, the vehicle processor 203 should not be construed as being limited to any particular computation architecture or combination of computation architectures, including those explicitly disclosed herein.

The vehicle memory 204 can include one or more hardware components that perform storage operations, including temporary or permanent storage operations. In some embodiments, the vehicle memory 204 includes volatile and/or non-volatile memory implemented in any method or technology for storage of information such as computer-readable instructions, data structures, program modules, the vehicle operating system 208, the vehicle firmware 206, the vehicle software application(s) 210, and/or other software, firmware, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the vehicle processor 203. The vehicle memory 204 may be configured substantially similar to memory 604 discussed with respect to FIG. 6. It is understood that one or more instances of the vehicle memory 204 can be included in one or more of the components of the vehicle 201 (and/or the vehicle 120 from FIG. 1), such as the vehicle head unit 211 (and/or the head unit 122) and/or the telematics control unit 209 (and/or the telematics control unit 128). As such, in the claims, the use of the phrase "vehicle memory" (or variations thereof) does not include waves or signals per se and/or communication media.

The vehicle firmware 206, which in some embodiments may also be known as microcode, can be written onto a ROM of the vehicle memory 204. The vehicle firmware 206 can be written on the ROM at the time of manufacturing and is used to execute programs on the vehicle processor 203. In some embodiments, the vehicle firmware 206 includes the vehicle operating system 208. In some embodiments, the vehicle firmware 206 is the vehicle operating system 208. In some embodiments, the vehicle firmware 206 and the vehicle operating system 208 are closely integrated for performance of operations of the vehicle 201.

The vehicle operating system 208 can control the operation of at least a portion of the vehicle 201. In some embodiments, the vehicle operating system 208 includes the functionality of the vehicle firmware 206 and/or the vehicle software application(s) 210. The vehicle operating system 208 can be executed by the vehicle processor 203 to cause the vehicle 201 to perform various operations. The vehicle operating system 208 can include, by way of example without limitation, a member of the SYMBIAN OS family of operating systems from SYMBIAN LIMITED; a member of the WINDOWS OS, WINDOWS MOBILE OS, and/or WINDOWS PHONE OS families of operating systems from MICROSOFT CORPORATION; a member of the PALM WEBOS family of operating systems from HEWLETT PACKARD CORPORATION; a member of the BLACKBERRY OS family of operating systems from RESEARCH IN MOTION LIMITED; a member of the IOS family of operating systems, a memory of the CARPLAY family of operating systems, and/or a member of the OS X family of operating systems from APPLE INC.; a member of the ANDROID OS family and/or the ANDROID AUTO family of operating systems from GOOGLE INC.; an open-source software operating system build around the LINUX kernel; a member of a real-time operating system; a member of a portable operating system interface automotive open system architecture and/or other operating systems. These operating systems are merely illustrative of some contemplated operating systems that may be used in accordance with various embodiments of the concepts and technologies described herein and therefore should not be construed as being limiting in any way. The vehicle software application(s) 210 can execute on top of the vehicle operating system 208. The vehicle software application(s) 210 can be executed by the vehicle processor 203 to cause the vehicle 201 (and/or components thereof, such as the vehicle head unit 211 and/or the telematics control unit 209) to perform various operations described herein. For example, the vehicle software application(s) 210 can be part of a vehicle entertainment system, a vehicle navigation system, a vehicle "ECU", and/or another computing system of the user vehicle. In some embodiments, the vehicle software application(s) 210 can include one or more instances of the vehicle OTT application 124 of FIG. 1.

The telematics control unit 209 may be configured substantially similar to the TCU 128 discussed with respect to FIG. 1. In some embodiments, the telematics control unit 209 may include and/or control the vehicle wireless communications components 212 discussed below. The telematics control unit 209 can include one or more instances of the vehicle processor 203, the vehicle memory 204, the vehicle operating system 208, and/or the vehicle firmware 206. The telematics control unit 209 may be configured to control the inflow and/or outflow of communications to and/or from the vehicle 201 via one or more of the vehicle wireless communications components 212. In various embodiments, the telematics control unit 209 can control, provide, and/or facilitate wireless tracking, wireless diagnostics, device pairing, crash notification, and other communication to/from the vehicle 201. In various embodiments, the telematics control unit 209 can include circuitry that operates as a network interface controller and can provide communication to the vehicle head unit 211 and/or one or more vehicle software applications 210. In various embodiments, the telematics control unit 209 can perform one or more functions and/or operations discussed herein, such as but not limited to operations discussed with respect to FIG. 1, FIG. 3, and/or FIG. 4.

The vehicle head unit 211 may be configured substantially similar to the head unit 122 discussed above with respect to FIG. 1. In some embodiments, the vehicle head unit 211 can include the display 211A that can be configured to present and/or provide audio output and/or video output via one or more user interface. The display 211A of the vehicle head unit 211 can have a display device that presents various user interfaces, requests, messages, and/or any other information (e.g., any of the messages, commands, requests, responses, and/or identifiers from FIG. 1) to a user or other occupant associated with the vehicle 120 and/or the vehicle 201. In some embodiments, the input/output component 211B can provide a user touch-screen, audio speakers, microphones, haptic feedback system, or other input and/or output device or component that can alert a user to various communications. As such, an instance of the input/output component 211B and/or the display 211A can be implemented to enable the input 127 to be provided to the head unit 122 of the vehicle 120.

The vehicle wireless communications component 212 can include one or more wireless wide area network ("WWAN") components (e.g., radio transceivers, antenna, etc.) capable of facilitating communication with one or more WWANs, such as the serving network 102 and/or the network 130. In some embodiments, one or more instances of the vehicle wireless communications component 212 can be configured to provide multi-mode wireless connectivity. For example, the vehicle wireless communications component 212 may be configured to provide connectivity to the serving network 102 and/or the network 130 and may provide functions in accordance with UMTS, LTE, 5G and New Radio standards, or via some other combination of technologies, and more particularly, one or more technologies that support cell broadcast functionality. In various embodiments, the vehicle wireless communications component 212 can include one or more instances of a transceiver, sensors, cameras, circuitry, antennas, and any other components that can support and facilitate sending and/or receiving communications over the vehicle communication interface 218 using the direct transmission mode 219 and/or the network communication interface 220 using the network transmission mode 221. In some embodiments, the vehicle communication interface 218 can be provided and/or hosted by the DSRC component 214 and/or the C-V2X component 216.

The direct transmission mode 219 refers to a communication routine (which may be executed by the telematics control unit 209) by which a vehicle can communicate messages to/from another device (while within each other's communication range) without the messages being passed through an intermediary device of the network (e.g., without being handled by any of the network access points 104, 132, the core server 134, the M2M platform 108, etc.). In some embodiments, the direct transmission mode 219 can be provided over an 802.11x protocol (e.g., 802.11p or protocol within the 802.11 family of wireless local area network standards), which in some embodiments may be referred to as protocols and/or standards for dedicated short-range communications ("DSRC"). In some embodiments, the direct transmission mode 219 can be provided using specifications pertaining to cellular V2X ("C-V2X"), which is initially defined by the Third Generation Partnership Project ("3GPP") Release 14, discussed in Release 15 and later. In various embodiments, standards and protocols of C-V2X may allow communication components to be configured to support the direct transmission mode 219 (e.g., via a PC5 interface) and the network transmission mode 221 (e.g., via a Uu interface). The vehicle communication interface 218 can be configured to use, support, and provide the direct transmission mode 219, and the network communication interface 220 can be configured to use, support, and provide the network transmission mode 221. In various embodiments, the network transmission mode 221 refers to a vehicle communication routine (which may be executed by the telematics control unit 209) by which the vehicle wireless communications component 212 uses and communicates with network infrastructure (e.g., network devices of the serving network 102 and/or the network 130) to transmit various communications that are directed to one or more device through a device of the network (i.e., network infrastructure), such as any of the network access points 104, 132, the M2M platform 108, and/or the core server 134. In some embodiments, one or more instances of a communication (e.g., any of the access probe message 150, the access probe message 150', the access denied response 153, the access redirect command 154, the access redirect request 160, the network service portal response 162, and/or the access probe response 164) may be generated and/or received with a configuration that facilitates and supports the use of the network transmission mode 221.

The DSRC component 214 can be a radio communications device and/or circuitry that can send and receive various communications (not shown) using the direct transmission mode 219. In some embodiments, the DSRC component 214 is configured to operate within a 5.9 GHz radio frequency band as defined by the United States Department of Transportation. In some embodiments, the DSRC component 214 is configured to operate within other radio frequency bands. In some embodiments, the DSRC component 214 can operate using 802.11p or other technology.

The C-V2X component 216 can be a radio communications device and/or circuitry that can send and receive V2X communications using the direct transmission mode 219 and/or the network transmission mode 221. In some embodiments, the C-V2X component 216 can operate in accordance with 3GPP Release 14 or later. The C-V2X component 216 can support and provide the vehicle communication interface 218 and/or the network communication interface 220. In various embodiments, the C-V2X component 216 can be configured to support 5G New Radio transmissions and direct communication transmissions so that communications may occur within and/or outside of a direct communication range. In some embodiments, the C-V2X component 216 can transmit and receive communications over the direct transmission mode 106 within an ITS spectrum, such as a 5.9 GHz ITS band. In some embodiments, the C-V2X component 216 can provide transmission latency that is no more than a defined amount of milliseconds (e.g., less than 10 milliseconds). In some embodiments, the TCU 128 can include, and/or be configured to invoke, the C-V2X component 216 and/or the vehicle DSRC component 214. It should be understood that the embodiment of the vehicle 201 illustrated in FIG. 2 is provided as an example of a possible implementation of the vehicle 120 discussed with respect to FIG. 1. The examples provided are for illustration purposes only, and therefore should not be construed as limiting in any way.

Figure 3:
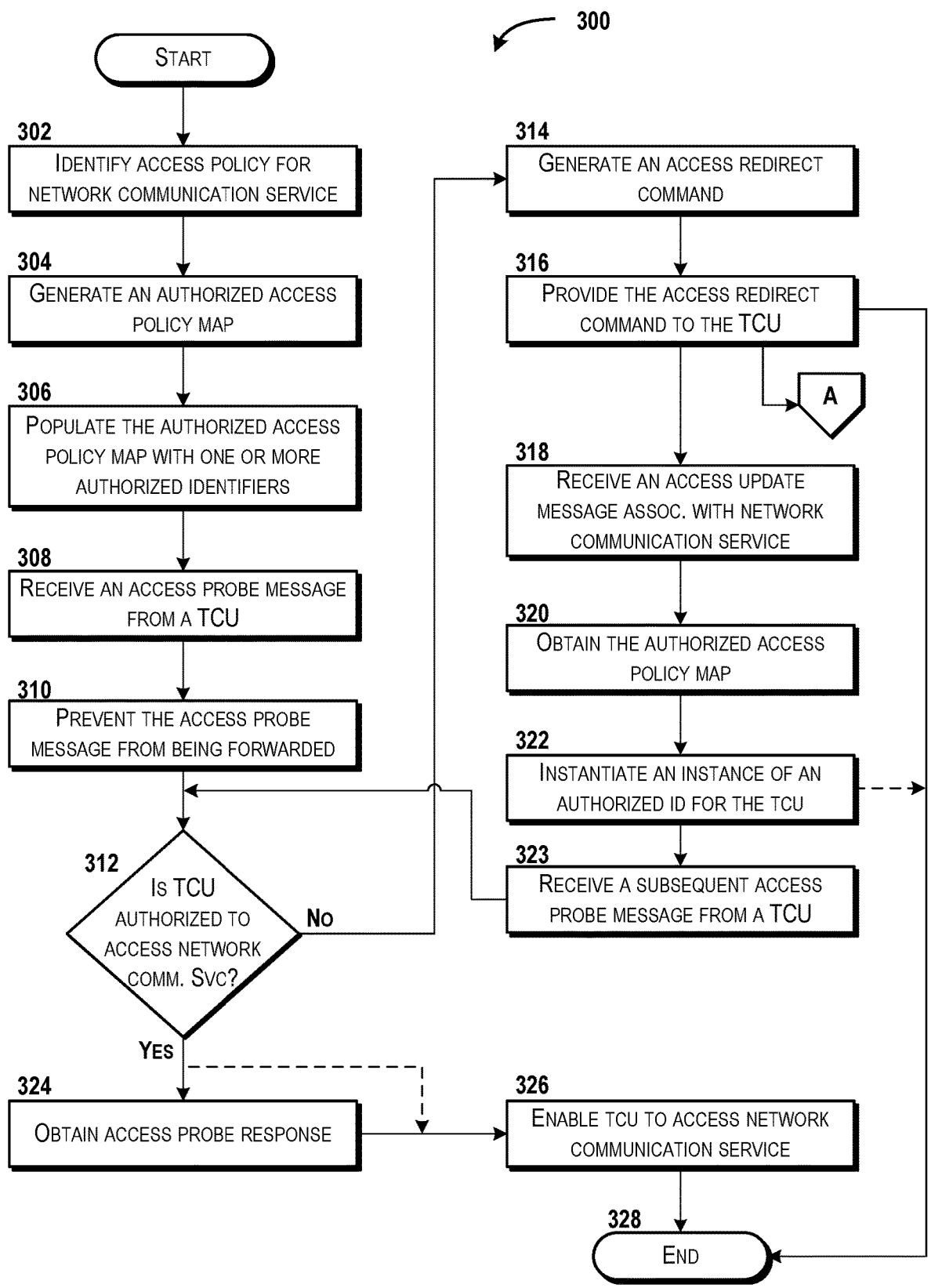
FIG. 3 is a flow diagram illustrating aspects of a method for network access optimization to support vehicle communications, according to an illustrative embodiment.
Figure 4:
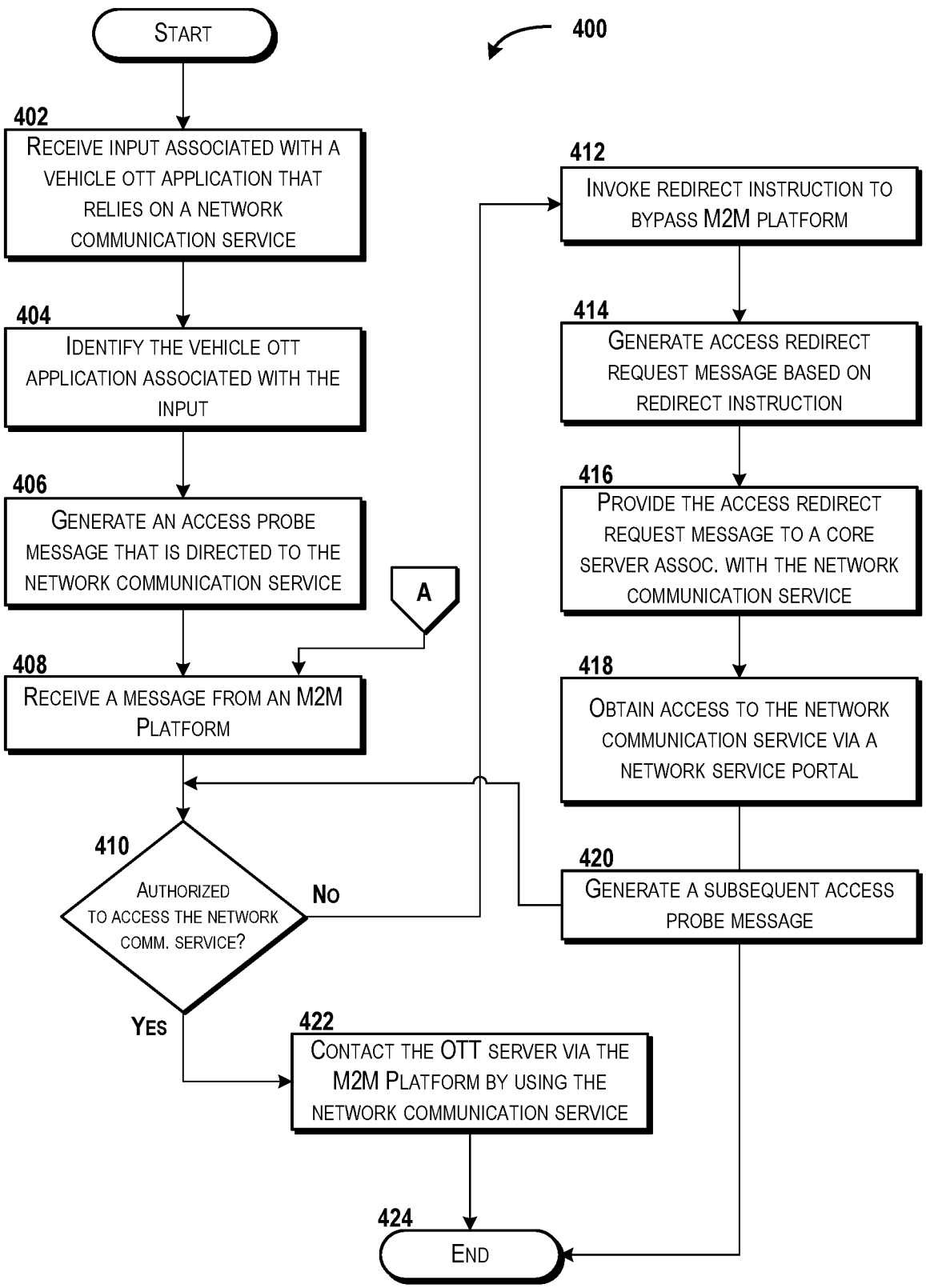
FIG. 4 is a flow diagram illustrating aspects of another method for network access optimization to support vehicle communications, according to an illustrative embodiment.

Turning now to FIGS. 3 and 4 with continued references to FIGS. 1 and 2, aspects of a method 300 and a method 400 for embodiments pertaining to aspects of connected vehicle network access optimization will be described in detail, according to various illustrative embodiments. It should be understood that each of the operations of the one or more methods disclosed herein (e.g., the method 300 and/or the method 400 discussed below) are not necessarily presented in any particular order and that performance of some or all of the operations in an alternate order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The phrases "computer executable instructions," and variants thereof (e.g., "computer-readable instructions"), as used herein, is used expansively to include routines, applications, modules, scripts, programs, plug-ins, data structures, algorithms, and the like. It is understood that any use of the term "module" (in the specification and claims) refers to a defined, callable set of computer-readable and executable instructions that, upon execution by a processor, configure at least a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, a network platform, edge devices, vehicles, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within one or more of the vehicle 120, serving network 102, the M2M platform 108, the M2M server 110, the network 130, the OTT server 131, and/or the core server 134, to perform one or more operations and/or causing one or more instances of a processor to direct other components of a computing system or device, to perform one or more of the operations.

For purposes of illustrating and describing the concepts of the present disclosure, one or more of the operations of methods disclosed herein are described as being performed by one or more instance of the TCU 128 and/or the head unit 122 of the vehicle 120, the M2M server 110 of the M2M platform 108, the core server 134 associated with the network communication service 138, or a combination thereof, via execution of one or more computer-readable instructions configured so as to instruct and transform a processor. It should be understood that additional and/or alternative devices and/or network infrastructure devices can, in some embodiments, provide the functionality described herein via execution of one or more routines, applications, and/or other software including, but not limited to, the vehicle OTT application 124, the NEMA 118, the control application 140, the vehicle software application 210, the vehicle firmware 206, the vehicle operating system 208, and/or any other computer executable instructions that can configure a device discussed herein, such as but not limited to one or more of the M2M platform 108, the M2M server 110, the vehicle 120, the OTT server 131, and/or the core server 134. Thus, the illustrated embodiments are illustrative, and should not be viewed as being limiting in any way.

In various embodiments, any computer system of the M2M platform 108 (e.g., the M2M server 110) can execute an instance of the NEMA 118 so as to cause one or more processor (e.g., an instance of the processor 111) to perform at least a portion of one or more operations discussed herein. In various embodiments, execution of the control application 140 can cause one or more instances of a core server 134 and/or the M2M server 110 to perform one or more operations discussed herein. It should be understood that the examples provided are for illustration purposes only, and therefore should not be construed as limiting in any way. The method 300 and the method 400 will be described with reference to one or more of the FIGS. 1 and 2.

Turning now to FIG. 3, the method 300 for connected vehicle network access optimization is disclosed, according to an illustrative embodiment. In an embodiment, the method 300 can be performed by a computer system of the M2M platform 108 (e.g., the M2M server 110 that executes the processor 111) that is configured by the NEMA 118 to perform one or more operation discussed herein. The M2M server 110 can communicatively couple to the network 130 and the vehicle 120. It is understood that one or more operations of the method 300 may be performed by, and/or in response to, any operation from another device and/or application, such as the control application 140 of the core server 134 and/or the TCU 128 of the vehicle 120. In various embodiments, the method 300 can begin at operation 302, where the NEMA 118 can identify the access policy 144 associated with the network communications service 138. The NEMA 118 can enforce the access policy 144 by instructing one or more network infrastructure devices of the serving network 102 (e.g., the network access point 104) to route instances of messages or communications from the vehicle 120 (e.g., the access probe message 150) to the M2M server 110 so that the M2M platform 108 serves as an intermediary device for access policy enforcement.

From operation 302, the method 300 can proceed to operation 304, where the NEMA 118 may enforce the access policy 144 by generating an instance of the AAPM 114 for use by the M2M platform 108. The AAPM 114 can be associated with the network communication service 138. The AAPM 114 can be based on the access policy 144 from the core server 134 that supports the network communication service 138. The access policy 144 can indicate or otherwise require that the vehicle 120 be authorized to use the network communication service 138 before one or more applications on the vehicle 120 (e.g., the vehicle OTT application 124) are permitted to use or otherwise maintain ongoing communicative coupling with the serving network 102 and/or the network 130 to access devices on and/or in communication with the network 130 (e.g., the OTT server 131).

From operation 304, the method 300 can proceed to operation 306, where the NEMA 118 can populate the AAPM 114 with one or more authorized identifiers (e.g., the authorized identifiers 116A-N) based on which identifiers (e.g., instances of the known TCU identifier 149) are currently present within one or more equipment profiles (e.g., the equipment profile 148) associated with the network communication service 138. For example, any device that is authorized to access and use the network communication service 138 will have a corresponding identifier (e.g., the known TCU identifier 149) stored in an instance of an equipment profile associated with the device (e.g., instances of the equipment profile 148). In turn, the control application 140 can provide, to the NEMA 118, the identifiers associated with devices (e.g., the known TCU identifier 149) that are authorized and permitted to use the network communication service 138. Therefore, if the vehicle 120 sends, to the M2M server 110, a message having an identifier included therein (e.g., the access probe message 150 having the TCU identifier 128A), but the AAPM 114 does not have an authorized identifier (e.g., any of the authorized identifiers 116A-N) matching or otherwise corresponding with the identifier from the vehicle 120, then messages from the vehicle 120 will not be permitted to pass through, or otherwise be routed via, the M2M platform 108 to a target destination, such as the OTT server 131, the core server 134, and/or any other device of network 130 and/or the serving network 102.

From operation 306, the method 300 can proceed to operation 308, where the NEMA 118 can receive an instance of the access probe message 150 from the TCU 128 of the vehicle 120. The access probe message 150 can include the probe URL 152. In some embodiments, the probe URL 152 can be associated with, or otherwise be directed to, the core server 134 and/or the network communication service 138. In some embodiments, the access probe message 150 can request forwarding to the core server 134 associated with the network communication service 138. In some embodiments, the access probe message 150 can include the TCU identifier 128A associated with the TCU 128 that sent the access probe message 150. In some embodiments, the probe URL 152 may be associated with the OTT server 131 and request access to the OTT server 131, where the OTT server 131 is associated with the vehicle OTT application 124 of the vehicle 120. In some embodiments, the access probe message 150 may be routed to the M2M platform 108 so that the M2M platform 108 intercepts the access probe message 150 before it can reach a target destination, such as the core server 134 and/or the OTT server 131.

From operation 308, the method 300 can proceed to operation 310, where the NEMA 118 can prevent the access probe message 150 from being forwarded on to a target destination, such as the core server 134 and/or the OTT server 131. The NEMA 118 can suspend execution of the request to forward the access probe message 150 on to a subsequent device so as to enable confirmation that the vehicle 120 which sent the access probe message 150 (specifically the TCU 128) is authorized and permitted to use the network communication service 138. By preventing the access probe message 150 from being forwarded, the NEMA 118 can improve the performance of network devices by reducing the amount of traffic that is routed to the core server 134 from the M2M platform 108. By this, the NEMA 118 and the M2M platform 108 can provide optimization of limited processing resources and memory resources (e.g., available via one or more instance of the M2M server 110), while also improving the speed with which the vehicle 120 can obtain network access and authorized to use the network communication service 138.

From operation 310, the method 300 can proceed to operation 312, where the NEMA 118 can determine whether the device which sent the message (e.g., the TCU 128 of the vehicle 120 that sent the access probe message 150) is authorized to access and use (i.e., engage in ongoing communicative coupling) the network communication service 138. In some embodiments, to determine whether the TCU 128 is authorized to access and use the network communication service 138, the NEMA 118 may determine whether an identifier is provided in the received message (e.g., the TCU identifier 128A provided in the access probe message 150) that matches, identifies, or otherwise corresponds with at least one authorized identifier of an authorized access policy map (e.g., at least one of the authorized identifiers 116A-N of the AAPM 114). If the TCU identifier 128A does not match one of the authorized identifiers 116A-N of the AAPM 114, then the TCU 128 is not authorized to access and use the network communication service 138. If, however, the TCU identifier 128A is found or otherwise reflected by at least one of the authorized identifiers 116A-N of the AAPM 114, then the TCU 128 of the vehicle 120 is authorized to access the network communication service 138, and thus permitted to contact a target destination via the M2M platform 108 (e.g., engaging in communication with the OTT server 131 using the network communication service 138).

In some embodiments, the NEMA 118 can determine that the TCU 128 is not authorized to access the network communication service 138, such as based on the TCU 128 having a TCU identifier 128A (which was included in the access probe message 150) that does not correspond with any of the authorized identifiers 116A-N of the AAPM 114. In response to determining that the TCU 128 is not authorized to access the network communication service 138, the method 300 can proceed along the NO path to operation 314. In response to determining that the TCU 128 is authorized to access the network communication service 138, the method 300 can proceed along the YES path to operation 324. For clarity, a discussion of the method 300 proceeding along the NO path to operation 314 will be provided first, followed by a discussion proceeding along the YES path to operation 324.

At operation 314, the NEMA 118 can generate the access redirect command 154 that can include the redirect instruction 156. The redirect instruction 156 can instruct the head unit 122 and/or the TCU 128 to bypass the M2M platform 108 so as to enable access to the network communication service 138 by contacting the network service portal 142 directly, that is without attempting to seek authorization for use of the network communication service 138 via the M2M platform 108. The redirect instruction 156 can include the redirect URL 158 that points to the core server 134 and/or the network service portal 142 associated with the network communication service 138. In some embodiments, the redirect instruction 156 can instruct a network access point (e.g., any of the network access points 104, 132) to permit a one-time bypass of the M2M platform 108 so that the vehicle 120 can contact the core server 134 and the network service portal 142 despite not yet being authorized to use the network communication service 138.

From operation 314, the method 300 can proceed to operation 316, where the NEMA 118 can provide the access redirect command 154 to the TCU 128 of the vehicle 120. In some embodiments, the method 300 can proceed from operation 316 to one or more operations discussed with respect to FIG. 4, such as operation 408 which are discussed below in further detail. In some embodiments, the method 300 can proceed from operation 316 to operation 328, where the method 300 can end.

In some other embodiments, from operation 316, the method 300 can proceed to operation 318, where the NEMA 118 can receive the access update message 170 from the core server 134 that supports the network communication service 138. The access update message 170 may be provided by the core server 134 to the M2M platform 108 in response to one of the equipment profiles being updated with an identifier to indicate a corresponding device is authorized and permitted to use the network communication service 138. For example, the TCU 128 may generate the access redirect request 160 based on the redirect instruction 156, where the access redirect request 160 can include the TCU identifier 128A of the TCU 128 and the redirect URL 158 that points to the network service portal 142. The TCU 128 can send the access redirect request 160 to the core server 134 so as to enable the vehicle 120 to gain permission to use the network communication service 138 via the network service portal 142. The user may provide an instance of the input 127 to the network service portal 142 to instruct the control application 140 of the core server 134 to allow the TCU 128 to access the network communication service 138. The core server 134 can grant the TCU 128 access to the network communication service 138 by referencing the TCU identifier 128A within the equipment profile 148 associated with the vehicle 120, specifically by instantiating and recording an instance of the known TCU identifier 149 (which corresponds with and reflects the TCU identifier 128A) within the equipment profile 148 associated with the vehicle 120. In turn, the control application 140 of the core server 134 can inform the M2M platform 108 of the TCU's 128 ability to use the network communication service 138 by providing the access update message 170 to the NEMA 118, where the access update message 170 can include the known TCU identifier 149. In some embodiments, the access update message 170 can indicate that the known TCU identifier 149 pertains to the AAPM 114 associated with the network communication service 138.

From operation 318, the method 300 can proceed to operation 320, where the NEMA 118 can obtain or otherwise access the AAPM 114 that is associated with the network communication service 138.

From operation 320, the method 300 can proceed to operation 322, where the NEMA 118 can instantiate an instance of an authorized identifier within the AAPM 114 so as to reflect the TCU 128 of the vehicle 120. For example, prior to receiving the access update message 170, the authorized identifier 116B may not yet exist within the AAPM 114. The NEMA 118 can create and configure the authorized identifier 116B to reflect (and thus correspond with) the known TCU identifier 149 from the access update message 170. As such, the authorized identifier 116B will now also correspond with the TCU identifier 128A that identifies the TCU 128. The NEMA 118 can update the AAPM 114 by instantiating the authorized identifier 116B for the TCU 128 in the AAPM 114. In some embodiments, from operation 322, the method 300 can proceed to operation 328, where the method 300 can end.

In some other embodiments, the method 300 can proceed from operation 322 to operation 323, where the NEMA 118 can receive a subsequent access probe message 150'. In some embodiments, the subsequent access probe message 150' may be configured substantially similar to the access probe message 150, and thus include an instance of the probe URL 152' and the TCU identifier 128A. The subsequent access probe message 150' may be received by the NEMA 118 of the M2M platform 108 subsequent to the AAPM 114 being updated by the core server 134 based on the TCU 128 being granted authorization by the core server 134 to use the network communication service 138. From operation 323, the method 300 can proceed to another iteration of the operation 312, where, in an embodiment, the NEMA 118 can analyze the subsequent access probe message 150' and the AAPM 114 to determine whether the TCU 128 is authorized to access and use the network communication service 138. This time, when the NEMA 118 analyzes the AAPM 114, the NEMA 118 can determine that one of the authorized identifiers (e.g., the authorized identifier 116B) corresponds with the TCU identifier 128A of the TCU 128, where the TCU identifier 128A was included in the subsequent access probe message 150'. As such, the NEMA 118 can determine that the TCU 128 (and thus also the vehicle 120) is now authorized to access and use the network communication service 138, which allows the method 300 to proceed along the YES path from operation 312 to operation 324. In some embodiments, the method 300 may proceed from operation 323 back to operation 312 and then along the YES from operation 312 to operation 326. For clarity, a discussion of operation 324 will be provided first, followed by a discussion of operation 326.

At operation 324, the NEMA 118 may seek to obtain an access probe response 164 from a target destination with which the vehicle 120 is attempting to communicate. For example, in an embodiment, the subsequent access probe message 150' may include the probe URL 152' that is directed towards the core server 134 so as to confirm that the vehicle OTT application 124 can begin communicating with the OTT server 131 via the M2M platform 108 while using the network communication service 138. The control application 140 of the core server 134 may send the access probe response 164 to the NEMA 118 to confirm that the vehicle 120 and TCU 128 are permitted to use the network communication service 138 and route messages to the OTT server 131 via the M2M platform 108. In some embodiments, the subsequent access probe message 150' may also, and/or additionally, seek confirmation from the OTT server 131 that the vehicle OTT application 124 is authorized to engage in a content stream (or other communication data stream) with the TCU 128 of the vehicle 120. The OTT server 131 can indicate approval and authorization via the same, or another, instance of the access probe response 164. From operation 324, the method 300 can proceed to operation 326.

Whether the method 300 proceeds to operation 326 from operation 312 or 324, at operation 326, the M2M platform 108 can enable and permit the TCU 128 to access the network communication service 138 for engaging in ongoing and/or sustained communications to and/or from the vehicle OTT application 124 via the M2M platform 108. The NEMA 118 may instruct the TCU 128 that the access policy 144 associated with the network communication service 138 requires or otherwise mandates that communications to and/or from the vehicle 120 pertaining to the vehicle OTT application 124 must be routed or otherwise directed through the M2M platform 108 in order to maintain authorization and permission to use the network communication service 138. As such, the vehicle OTT application 124 may now be authorized to communicate with the OTT server 131 based on the TCU 128 directing or otherwise routing communications to via the M2M platform 108 so as to maintain use of the network communications service 138.

In some embodiments, if the TCU 128 has already been granted authorization to use the network communication service 138, and subsequently attempts to bypass the M2M platform 108 in routing communications to the OTT server 131, the control application 140 and/or the NEMA 118 may revoke the permission of the TCU 128 to use the network communication service 138 by removing the authorized identifier associated with the TCU 128 (e.g., the authorized identifier 116B) from the AAPM 114. The NEMA 118 may send the vehicle 120 an instance of the access denied response 153 based on violation of the access policy 144 due to an attempt to bypass the M2M platform 108 after access to the network communication service 138 has already (or initially) been granted.

From operation 326, the method 300 can proceed to operation 328, where the method 300 can end. It should be understood that the examples provided are for illustration purposes only, and therefore should not be construed as limiting in any way.

Turning now to FIG. 4, the method 400 for connected vehicle network access optimization is disclosed, according to an illustrative embodiment. In an embodiment, the method 400 can be performed by the TCU 128 and/or the head unit 122 executing an instance of a processor. It is understood that, in various embodiments, one or more of the operations may be performed by the head unit 122, the TCU 128, and/or another computer system or user equipment of the vehicle 120. It should be understood that the examples provided are for illustration purposes only, and therefore should not be construed as limiting in any way.

In some embodiments, the method 400 can begin at operation 402, where the TCU 128 can receive an instance of the input 127 from the head unit 122 of the vehicle 120. In some embodiment, the instance of the input 127 can be associated with the vehicle OTT application 124, and thus trigger the head unit 122 to launch the vehicle OTT application 124. The vehicle OTT application 124 can request the TCU 128 to establish a network connection so that the vehicle OTT application 124 can communicate with the OTT server 131.

From operation 402, the method 400 can proceed to operation 404, where the TCU 128 can identify the vehicle OTT application 124 based on the application identifier 126. The TCU 128 can confirm that the vehicle OTT application 124 is requesting access to the OTT server 131 by engaging in wireless communicative coupling.

From operation 404, the method 400 can proceed to operation 406, where the TCU 128 can generate the access probe message 150 that is directed to the core server 134 to probe for access and authorization to the network communication service 138 so that the vehicle OTT application 124 can communicate with the OTT server 131. In various embodiments, the access probe message 150 can be sent to the M2M platform 108, which may perform one or more operations discussed with respect to FIG. 3.

From operation 406, the method 400 can proceed to operation 408, where the TCU 128 can receive a message from the M2M platform 108, such as the access redirect command 154 that includes the redirect instruction 156.

From operation 408, the method 400 can proceed to operation 410, where the TCU 128 can determine whether the message that is received (e.g., the access redirect command 154) authorizes the TCU 128 to access the network communication service 138. In some embodiments, the TCU 128 can determine that the message (e.g., the access redirect command 154) includes the redirect instruction 156 but does not yet indicate that access to the network communication service 138 has been authorized. If access to the network communication service 138 has not been authorized, the method 400 can proceed along the NO path to operation 412. If access to the network communication service 138 is indicated as being authorized, then the method 400 can proceed along the YES path to operation 422. For clarity, as discussion of the operations proceeding from the NO path to operation 412 will be discussed first, followed by a discussion of the operation 422 that proceeds from the YES path.

From operation 410, the method 400 can proceed along the NO path to operation 412, where the TCU 128 can invoke the redirect instruction 156 from the access redirect command 154 so as to bypass the M2M platform 108.

From operation 412, the method 400 can proceed to operation 414, where the TCU 128 can generate the access redirect request 160 based on the redirect instruction 156. The access redirect request 160 can include the redirect URL 158 and the TCU identifier 128A associated with the TCU 128. The access redirect request 160 can be directed to the core server 134 associated with the network communication service 138. The redirect URL 158 can point or otherwise direct the access redirect request 160 to the network service portal 142 so as to request access and authorization to use the network communication service 138.

From operation 414, the method 400 can proceed to operation 416, where the TCU 128 can provide the access redirect request 160 to the core server 134 associated with the network communication service 138. The access redirect request 160 can request access and authorization of the network communication service 138 via the network service portal 142.

From operation 416, the method 400 can proceed to operation 418, where the TCU 128 can obtain access to the network communication service 138 via the network service portal 142. The control application 140 can update the equipment profile 148 by using the TCU identifier 128A to record, in the equipment profile 148, the known TCU identifier 149 associated with the TCU 128. The TCU 128 can receive the network service portal response 162 indicating that access to the network communication service 138 has been granted and that communicative coupling can proceed via the M2M platform 108.

From operation 418, the method 400 can proceed to operation 420, where the TCU 128 can generate the subsequent access probe message 150'. In some embodiments, the access probe message 150 may be referred to as a "first" access probe message and the subsequent access probe message 150' may be referred to as a "second" access probe message. Use of the terms "first" and "second" are provided for clarification purposes only, and therefore should not be construed as requiring a preference, importance, hierarchy, sequence, or the like. In some embodiments, the method 400 can proceed from operation 420 to operation 424, where the method 400 can end.

In some other embodiments, from operation 420, the method 400 can proceed to another iteration of the operation 410. For example, in an embodiment, when the operation 410 is preceded by operation 420, the TCU 128 can determine whether access to the network communication service 138 has been authorized by analyzing the network service portal response 162. If the access to the network communication service 138 is granted, the TCU 128 may proceed along the YES path to operation 422. At operation 422, the TCU 128 can initiate contact with the OTT server 131 via the M2M platform 108 by sending the subsequent access probe message 150' to the M2M platform 108. The TCU 128 can receive the access probe response 164 that confirms that M2M platform 108 authorizes the TCU 128 to use the network communication service 139 and contact the OTT server 131 via the M2M platform 108. The TCU 128 can then permit the vehicle OTT application 124 to send a request (not shown) to the OTT server 131 by way of the M2M platform 108 so as to maintain execution of the vehicle OTT application 124 on the head unit 122. From operation 422, the method 400 can proceed to operation 424, where the method 400 can end.

Figure 5:
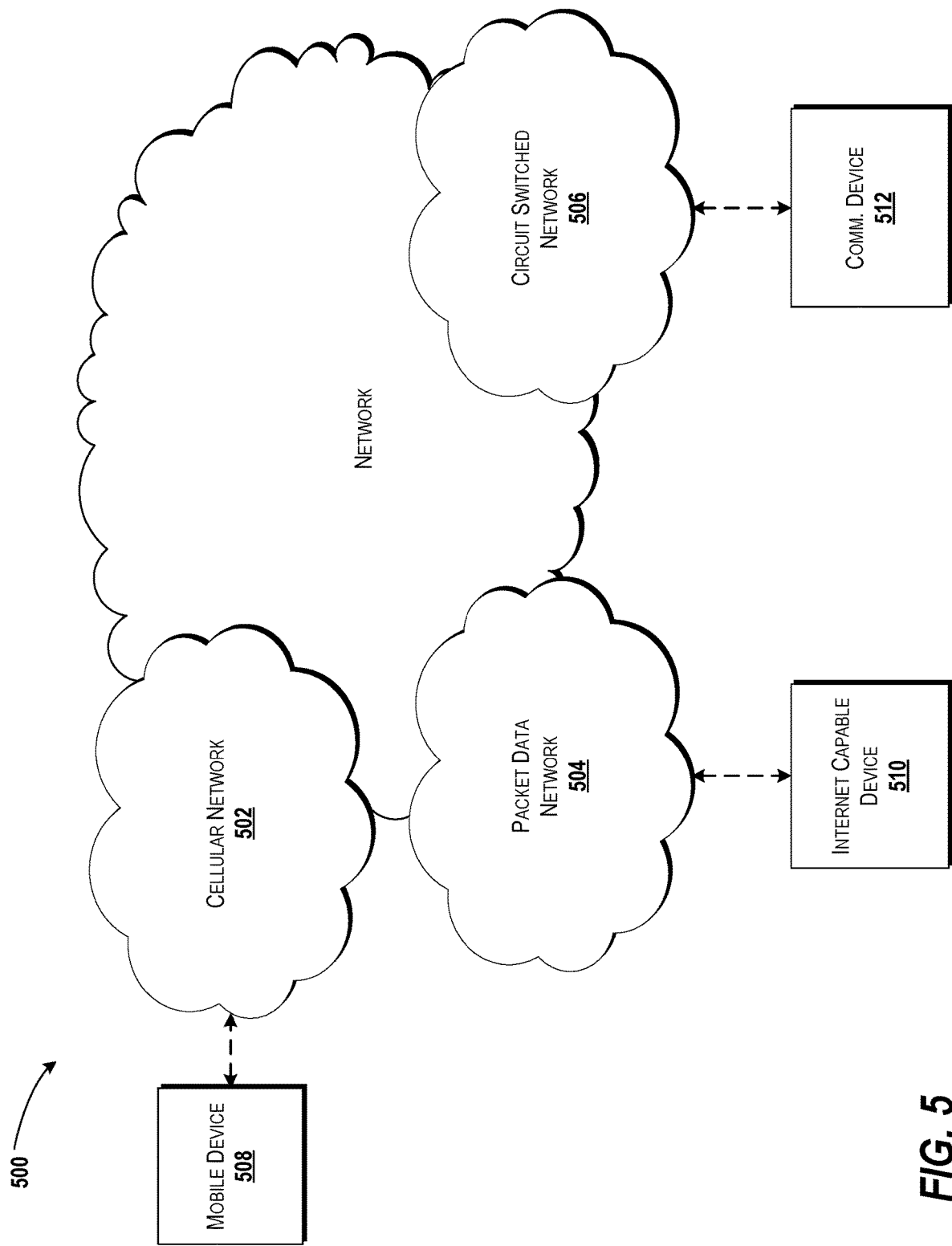
FIG. 5 is a diagram illustrating an example network capable of implementing aspects of the embodiments discussed herein.

Turning now to FIG. 5, a discussion of a network 500 is illustrated, according to an illustrative embodiment. The serving network 102 and/or the network 130 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), node-B's ("NBs"), e-Node-B's ("eNBs"), g-Node-B's ("gNBs"), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), 5G core components, 5G NR components, functions, applications, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G NR, as well as evolved and future mobile standards.

The packet data network 504 includes various devices, for example, servers, computers, databases, and other devices in communication with one another, as is generally understood. The network 130 may be configured as an instance of the packet data network 504 so as to support the network communication service 138. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, the TCU 128 of the vehicle 120, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems discussed with respect to FIG. 1, such as but not limited to the TCU 128 of the vehicle 120, the M2M server 110 of the M2M platform 108, the OTT server 131, and/or the core server 134. In the specification, the serving network 102, the network 130, /or the network 500 can refer broadly to, in some embodiments, any combination of the networks 502, 504, 506. It should be appreciated that substantially all of the functionality described with reference to devices of the serving network 102, the network 130, and/or the network 500 can, in some embodiments, be performed by the cellular network 502, the packet data network 504, and/or the circuit switched network 506, alone or in combination with other networks, network elements, and the like.

Figure 6:
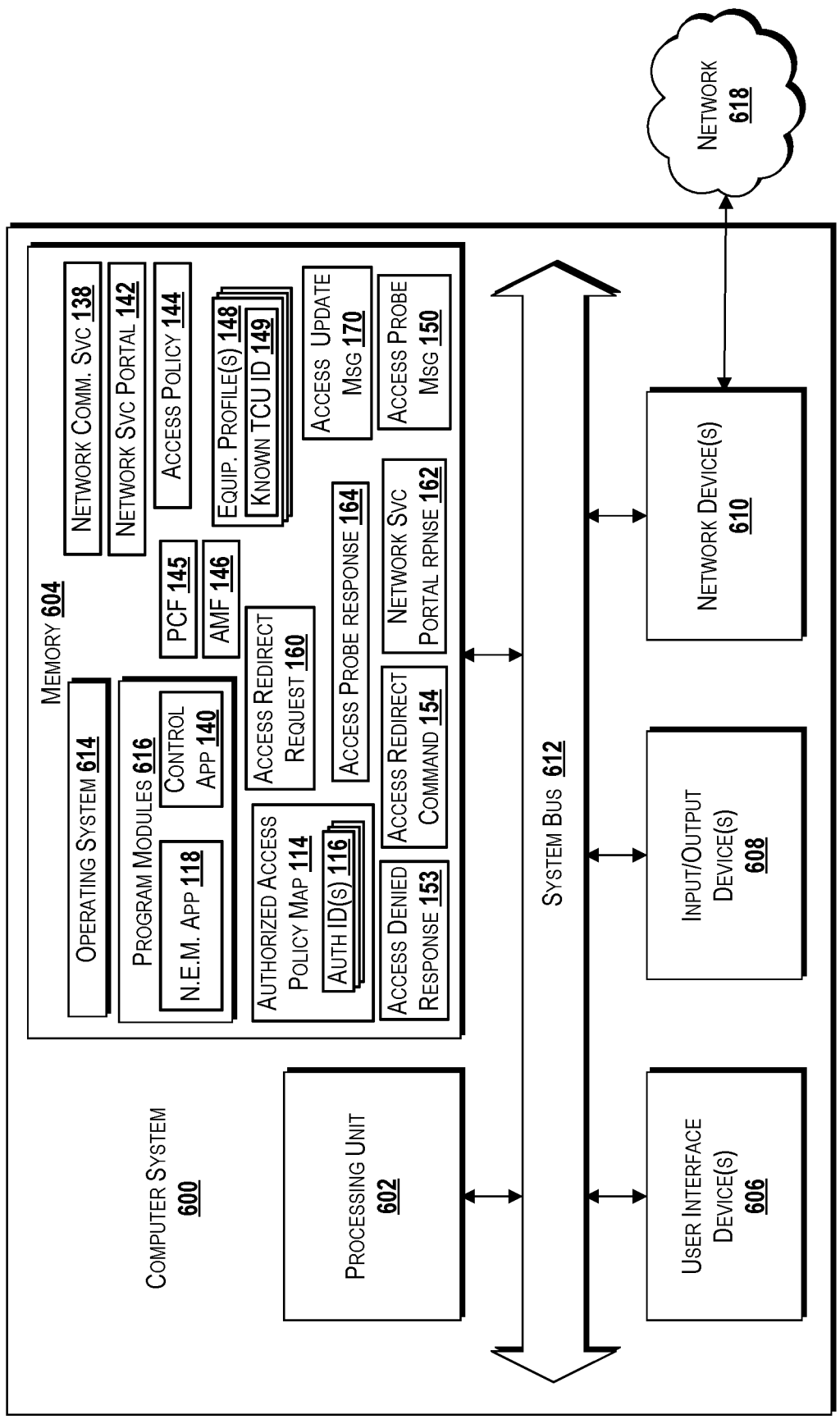
FIG. 6 is a block diagram illustrating an example computer system capable of implementing aspects of the embodiments presented and described herein.

FIG. 6 is a block diagram illustrating a computer system 600 can be configured to provide the functionality described herein related to connected vehicle network access optimization, in accordance with various embodiments of the concepts and technologies disclosed herein. In some embodiments, at least a portion of one or more of the M2M server 110, the network access point 104, the network access point 132, the OTT server 131, and/or the core server 134 illustrated and described herein can be configured as and/or can have an architecture similar or identical to the computer system 600. In some embodiments, the head unit 122 and/or the TCU 128 of the vehicle 120, and/or at least a portion of the vehicle 201 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 111 and/or the processor 135 can be configured substantially similar to the processing unit 602. In various embodiments, one or more instances of the processing unit 602 can be implemented within one or more devices and/or components of the operating environment 100, such as but not limited to one or more of the head unit 122, the TCU 128, the network access point 104, the serving network 102, the M2M platform 108, the M2M server 110, the network 130, the OTT server 131, the network access point 132, and/or the core server 134. In some embodiments, the vehicle processor 203 can be configured substantially similar to an instance of the processing unit 602. In some embodiments, the memory 112, the memory 136, and/or the vehicle memory 204 can be configured substantially similar to the memory 604. As such, one or more instances of the memory 604 can be implemented within one or more devices and/or components of the operating environment 100, such as but not limited to one or more of the head unit 122, the TCU 128, the network access point 104, the serving network 102, the M2M platform 108, the M2M server 110, the network 130, the OTT server 131, the network access point 132, and/or the core server 134.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known to one of ordinary skill, the processors and processing units disclosed and discussed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. Use of the term "module" refers to a defined set of computer readable instructions that transform a processor and/or other computing hardware upon execution by a processing unit, such as the processing unit 602. In some embodiments, for example, the program modules 616 can include the NEMA 118, the control application 140, and/or other computer-readable instructions. These and/or other programs can be embodied in computer-readable media containing instructions that, when executed by the processing unit 602, perform one or more of the operations and functions discussed with respect to FIG. 1 and/or the methods 300 and/or 400 described in detail above with respect to FIGS. 3 and 4. According to some embodiments, the program modules 616 may be embodied in hardware, software, firmware, or any combination thereof. It should be understood that the memory 604 also can be configured to store one or more instance of information and data discussed with respect to FIGS. 1, 2, 3, and/or 4, such as but not limited to the AAPM 114, the authorized identifiers 116A-N, the network communication service 138, the network service portal 142, the access policy 144, one or more instance of the equipment profile 148, one or more instance of the known TCU identifier 149, the access probe message 150, the access denied response 153, the access redirect command 154, the network service portal response 162, the access probe response 164, the PCF 145, the AMF 146, or any other communication, message, data instance, instruction, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory", "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618, which may be configured substantially similar to one or more of the serving network 102, the network 130, and/or the network 500. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 180 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). It should be understood that the examples provided are for illustration purposes only, and therefore should not be construed as limiting in any way.

Figure 7:
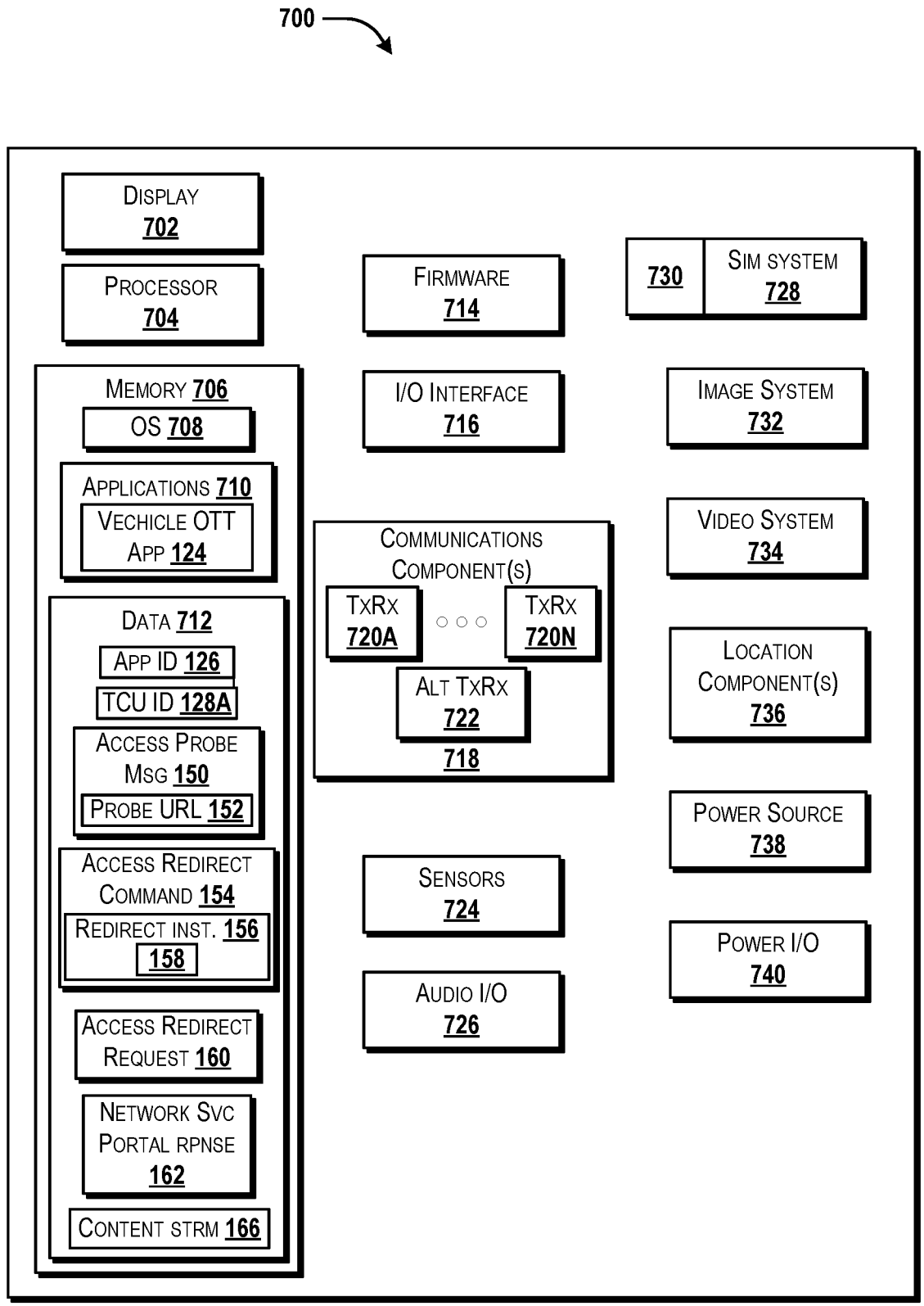
FIG. 7 is a diagram illustrating an example user equipment capable of implementing aspects of the concepts and technologies described herein according to embodiments of the present disclosure.

Turning now to FIG. 7, an illustrative user equipment 700 and components thereof will be described. In some embodiments, the head unit 122, the TCU 128, and/or other devices illustrated and described herein can be configured as and/or can have an architecture similar or identical to the user equipment 700 described herein in FIG. 7. In some embodiments, an instance of the user equipment 700 can be associated with a user of the vehicle 120. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an media content data stream, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as a vehicle OTT application 124 and/or a display application (not shown) that can present communications, data, and/or other computer-executable instructions stored in a memory 706, and/or received by the user equipment 700. In some embodiments, the applications 710 also can include a user interface application (not illustrated in FIG. 7).

The UI application can interface with the operating system 708 to facilitate any of the operations discussed herein and functionality for presenting audiovisual content and/or data stored at the user equipment 700 and/or stored elsewhere. It is understood that one or more instances of the operating system 708 may be included and operate within one or more systems discussed with respect to the operating environment 100, such as but not limited to the vehicle 120, the head unit 122, and/or the TCU 128. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The vehicle OTT application 124 can be executed by the processor 704 to aid a user in presenting content, obtaining network access to use the network communication service 138, providing feedback, presenting an identifier (e.g., the TCU identifier 128A), configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. According to various embodiments, the data 712 can include, for example, instances of the application identifier 126, the TCU identifier 128A, the access probe message 150, the probe URL 152, the access redirect command 154, the redirect instruction 156, the redirect URL 158, the access redirect request 160, the network service portal response 162, the content stream 166, the access denied response 153, the input 127, any other elements discussed with respect to FIG. 1 and FIG. 2, presence applications, visual voice mail applications, messaging applications, text-to-speech and speech-to-text applications, add-ons, plug-ins, email applications, music and/or streaming applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any computer system and/or device discussed in FIG. 1 (e.g., the head unit 122, the TCU 128, the M2M server 110, the OTT server 131, the core server 134, etc.). The I/O interface 716 can be configured to support the input/output of data such as a communication and/or message sent to and/or from the vehicle 120 (and/or any data that can be sent within the vehicle 120), and/or any other information or elements discussed with respect to FIGS. 1, 2, 3, and 4, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks such as the network 180 and/or the RAN 182 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 3G, 4G, 5G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 718 can support one or more communication modes discussed with respect to FIG. 2, such as the network transmission mode 221 over a Uu interface and/or the direct transmission mode 219 over a PC5 interface.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 maybe included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to connected vehicle network access optimization have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A system comprising:
    a processor; and
    a memory storing computer-executable instructions that, in response to execution by the processor, cause the processor to perform operations comprising:
        intercepting an access probe message from a telematics control unit of a vehicle, wherein the access probe message is directed to a core server associated with a network communication service that supports operation of a vehicle over-the-top application executing on the vehicle, wherein the access probe message requests access to the network communication service, and wherein the system is part of a machine-to-machine platform that controls access to the network communication service,
        determining that the telematics control unit is not authorized to access the network communication service,
        in response to determining that the telematics control unit is not authorized to access the network communication service, generating an access redirect command that provides a head unit of the vehicle with a one-time bypass of the machine-to-machine platform so as to enable the vehicle to bypass the machine-to-machine platform and access the core server associated with the network communication service directly via a network service portal to become authorized to access the network communication service, and
        providing the access redirect command to the telematics control unit of the vehicle.

2. The system of claim 1, wherein the access probe message comprises a probe uniform resource locator that is associated with the network communication service.

3. The system of claim 1, wherein the operations further comprise preventing the access probe message from being forwarded to the core server associated with the network communication service.

4. The system of claim 1, wherein the operations further comprise generating an authorized access policy map associated with the network communication service, wherein the authorized access policy map is based on an access policy from the core server associated with the network communication service.

5. The system of claim 4, wherein determining that the telematics control unit is not authorized to access the network communication service is based on the telematics control unit having a telematics control unit identifier that does not correspond with an authorized identifier of the authorized access policy map.

6. The system of claim 4, wherein the operations further comprise:
    receiving an access update message from the core server associated with the network communication service; and
    instantiating an instance of an authorized identifier on the authorized access policy map for the telematics control unit of the vehicle.

7. A method comprising:
    intercepting, by a server of a machine-to-machine platform that controls access to a network communication service, an access probe message from a telematics control unit of a vehicle, wherein the access probe message is directed to a core server associated with the network communication service, wherein the network communication service supports operation of a vehicle over-the-top application executing on the vehicle, and wherein the access probe message requests access to the network communication service;
    determining, by the server, that the telematics control unit is not authorized to access the network communication service;
    in response to determining that the telematics control unit is not authorized to access the network communication service, generating, by the server, an access redirect command that provides a head unit of the vehicle with a one-time bypass of the machine-to-machine platform so as to enable the vehicle to bypass the machine-to-machine platform and access the core server associated with the network communication service directly via a network service portal to become authorized to access the network communication service; and
    providing, by the server, the access redirect command to the telematics control unit of the vehicle.

8. The method of claim 7, wherein the access probe message comprises a probe uniform resource locator that is associated with the network communication service.

9. The method of claim 7, further comprising preventing, by the server, the access probe message from being forwarded to the core server associated with the network communication service.

10. The method of claim 7, further comprising generating, by the server, an authorized access policy map associated with the network communication service, wherein the authorized access policy map is based on an access policy from the core server associated with the network communication service.

11. The method of claim 10, wherein determining that the telematics control unit is not authorized to access the network communication service is based on the telematics control unit having a telematics control unit identifier that does not correspond with an authorized identifier of the authorized access policy map.

12. The method of claim 10, further comprising:
    receiving, by the server, an access update message from the core server associated with the network communication service; and
    instantiating, by the server, an instance of an authorized identifier on the authorized access policy map for the telematics control unit of the vehicle.

13. A computer storage medium having computer-executable instructions stored thereon that, in response to execution by a processor of a server, causes the processor to perform operations comprising:
- intercepting an access probe message from a telematics control unit of a vehicle, wherein the access probe message is directed to a core server associated with a network communication service that supports operation of a vehicle over-the-top application executing on the vehicle, wherein the access probe message requests access to the network communication service, and wherein the server is part of a machine-to-machine platform that controls access to the network communication service;
- determining that the telematics control unit is not authorized to access the network communication service;
- in response to determining that the telematics control unit is not authorized to access the network communication service, generating an access redirect command that provides a head unit of the vehicle with a one-time bypass of the machine-to-machine platform so as to enable the vehicle to bypass the machine-to-machine platform and to access the core server associated with the network communication service directly via a network service portal to become authorized to access the network communication service; and
- providing the access redirect command to the telematics control unit of the vehicle.

14. The computer storage medium of claim 13, wherein the access probe message comprises a probe uniform resource locator that is associated with the network communication service.

15. The computer storage medium of claim 13, wherein the operations further comprise preventing the access probe message from being forwarded to the core server associated with the network communication service.

16. The computer storage medium of claim 13, wherein the operations further comprise generating an authorized access policy map associated with the network communication service, wherein the authorized access policy map is based on an access policy from the core server associated with the network communication service.

17. The computer storage medium of claim 16, wherein determining that the telematics control unit is not authorized to access the network communication service is based on the telematics control unit having a telematics control unit identifier that does not correspond with an authorized identifier of the authorized access policy map.

18. The computer storage medium of claim 16, wherein the operations further comprise:
- receiving an access update message from the core server that supports the network communication service; and
- instantiating an instance of an authorized identifier on the authorized access policy map for the telematics control unit of the vehicle.

* * * * *